(12) United States Patent
Li et al.

(10) Patent No.: US 11,700,293 B2
(45) Date of Patent: *Jul. 11, 2023

(54) SCHEDULING METHOD AND TERMINAL

(71) Applicant: Huawei Technologies Co., Ltd., Shenzhen (CN)

(72) Inventors: Jiechun Li, Beijing (CN); Xin Yao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/483,058

(22) Filed: Sep. 23, 2021

(65) Prior Publication Data

US 2022/0086214 A1 Mar. 17, 2022

Related U.S. Application Data

(63) Continuation of application No. 16/614,575, filed as application No. PCT/CN2017/092542 on Jul. 11, 2017, now Pat. No. 11,140,208.

(30) Foreign Application Priority Data

May 17, 2017 (CN) .......................... 201710348362.3

(51) Int. Cl.
| | |
|---|---|
| G06F 15/16 | (2006.01) |
| H04L 65/80 | (2022.01) |
| H04L 65/403 | (2022.01) |
| H04W 4/06 | (2009.01) |
| H04L 65/611 | (2022.01) |

(52) U.S. Cl.
CPC ............ *H04L 65/80* (2013.01); *H04L 65/403* (2013.01); *H04L 65/611* (2022.05); *H04W 4/06* (2013.01)

(58) Field of Classification Search
CPC ........ H04L 67/26; H04L 67/32; H04L 67/325
See application file for complete search history.

(56) References Cited

U.S. PATENT DOCUMENTS

| | | | |
|---|---|---|---|
| 6,601,012 B1 | 7/2003 | Horvitz et al. | |
| 7,596,382 B2 | 9/2009 | Bae | |
| 9,477,399 B1 | 10/2016 | Wardle et al. | |
| 11,140,208 B2 * | 10/2021 | Li | H04W 4/06 |
| 2011/0173620 A1 | 7/2011 | Dyer et al. | |
| 2014/0126364 A1 | 5/2014 | Stanwood et al. | |
| 2016/0062556 A1 | 3/2016 | Chung et al. | |
| 2017/0003832 A1 | 1/2017 | Woley et al. | |

FOREIGN PATENT DOCUMENTS

| | | |
|---|---|---|
| CN | 103650440 A | 3/2014 |
| CN | 104994481 A | 10/2015 |
| CN | 105260138 A | 1/2016 |

(Continued)

*Primary Examiner* — Yves Dalencourt
(74) *Attorney, Agent, or Firm* — Conley Rose, P.C.

(57) ABSTRACT

A scheduling method includes controlling, by a terminal, a scheduling speed of broadcast scheduling events when a first preset condition is met. The first preset condition includes that a quantity of broadcast scheduling events in a preset time window is greater than or equal to a first preset value. The broadcast scheduling event is distributing a broadcast to a receiver. The receiver includes at least one of software, a component, or a program.

20 Claims, 12 Drawing Sheets

(56) References Cited

FOREIGN PATENT DOCUMENTS

| | | | |
|---|---|---|---|
| CN | 106155498 | A | 11/2016 |
| CN | 106484473 | A | 3/2017 |
| CN | 106528298 | A | 3/2017 |
| CN | 106534571 | A | 3/2017 |
| CN | 106572256 | A | 4/2017 |
| CN | 106662975 | A | 5/2017 |
| EP | 1264238 | A2 | 12/2002 |
| WO | 0169387 | A2 | 9/2001 |

* cited by examiner

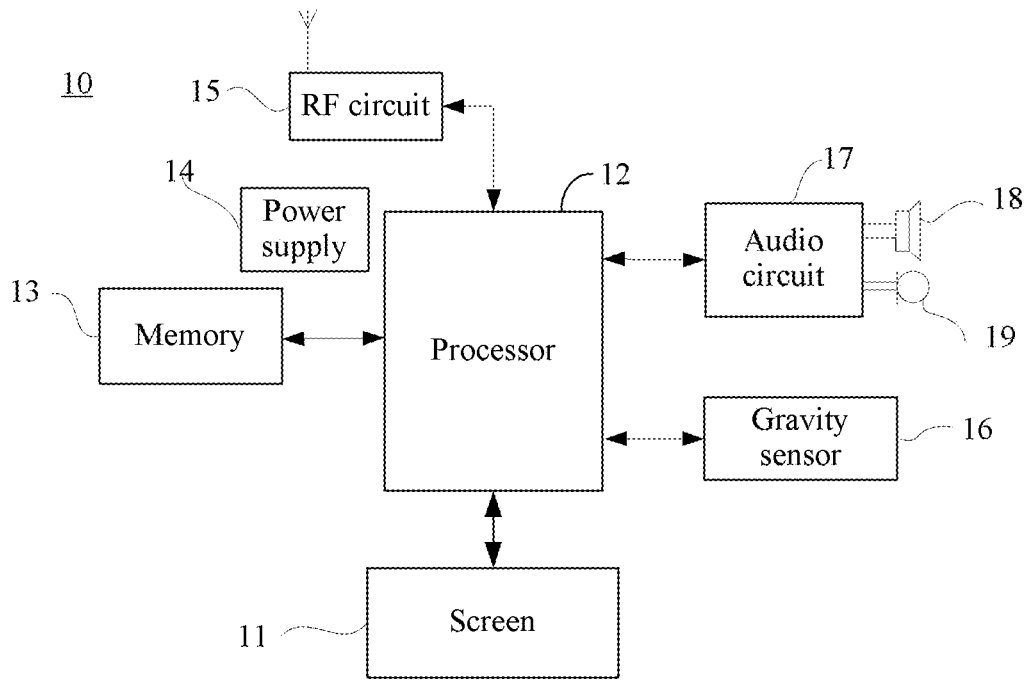
FIG. 2
When a first preset condition is met, a terminal controls a scheduling speed of broadcast scheduling events, where the first preset condition includes that a quantity of broadcast scheduling events in a preset time window is greater than or equal to a first preset value — 100
FIG. 3
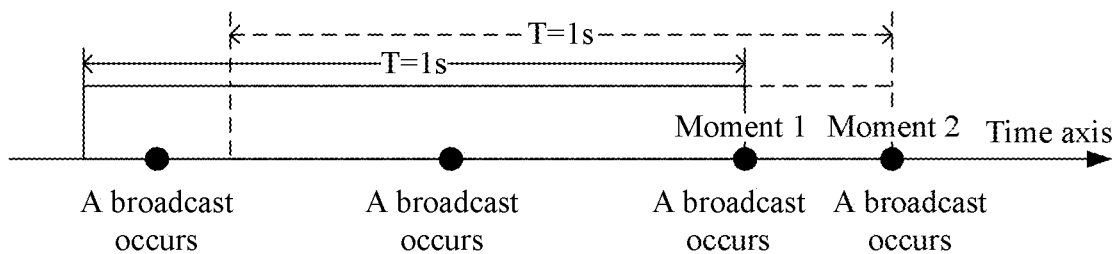
FIG. 4

| Broadcast scheduling event 0 | Broadcast scheduling event 1 | ... | Broadcast scheduling event i | ... | Broadcast scheduling event I–1 | Broadcast scheduling event I |
|---|---|---|---|---|---|---|
| $\Delta t_0$ | $\Delta t_1$ | ... | $\Delta t_i$ | ... | $\Delta t_{I-1}$ | $\Delta t_I$ |

SCHEDULING METHOD AND TERMINAL

CROSS-REFERENCE TO RELATED APPLICATIONS

This application is a continuation of U.S. patent application Ser. No. 16/614,575 filed on Nov. 18, 2019, which is a National Stage of International Patent Application No. PCT/CN2017/092542 filed on Jul. 11, 2017, which claims priority to Chinese Patent Application No. 201710348362.3 filed on May 17, 2017. All of the aforementioned applications are hereby incorporated by reference in their entireties.

TECHNICAL FIELD

Embodiments of this application relate to the field of terminal technologies, and in particular, to a scheduling method and a terminal.

BACKGROUND

A broadcast is a commonly used communications mechanism of an Android (android) operating system, and is used to notify of related status information of a terminal. The broadcast is sent by a system or an application that acts as a broadcast source. An application that has been registered for a broadcast may act as a receiver to listen to and receive the broadcast related to a service of the application. Broadcasts may be classified into a parallel broadcast (parallel broadcast), an ordered broadcast (ordered broadcast), and the like.

Referring to FIG. 1a, when a parallel broadcast occurs, a processing solution in the prior art is: A terminal schedules, at one time by using a broadcast registration and distribution management center, all receivers that have been registered for the broadcast, to process a related service. When the solution in the prior art is used, one occasional broadcast is immediately transferred to several and even tens of receivers to simultaneously and concurrently process a related service. Referring to FIG. 1b, when there are a specific quantity of receivers that perform concurrent processing, a broadcast storm occurs, and this results in instantaneous system busyness, and causes a temporary system calculation resource shortage. As a result, there are a series of problems such as terminal display interface freeze, processing speed slowdown, quick power consumption, and large heat production. Consequently, usage experience of a user is relatively poor.

SUMMARY

Embodiments of this application provide a scheduling method and a terminal, so as to improve usage experience of a user.

To achieve the foregoing objective, the following technical solutions are used in the embodiments of this application.

According to a first aspect, an embodiment of this application provides a scheduling method, including: when a first preset condition is met, controlling, by a terminal, a scheduling speed of broadcast scheduling events. The first preset condition includes that a quantity of broadcast scheduling events in a preset time window is greater than or equal to a first preset value. The broadcast scheduling event is distributing a broadcast to a receiver, and the receiver includes at least one of software, a component, or a program.

In this way, in a process of processing the broadcast scheduling events, the terminal may control the scheduling speed of the broadcast scheduling events, to extend a processing time of the broadcast scheduling events, and reduce a quantity of simultaneously processed broadcast scheduling events, so that a broadcast storm can be suppressed, and problems such as terminal screen freeze and processing speed slowdown caused by an excessively large quantity of simultaneously processed broadcast scheduling events can be avoided, thereby improving usage experience of a user.

With reference to the first aspect, in a possible implementation, the broadcast is a broadcast in an Android system.

In this way, the scheduling method in this embodiment of this application is a scheduling method for a broadcast in an Android system and a broadcast scheduling event corresponding to the broadcast.

With reference to the first aspect or the possible implementation of the first aspect, in another possible implementation, the first preset condition further includes that a display interface of the terminal is changing.

When the display interface of the terminal is changing, it may indicate that the user is interacting with a terminal screen. In this case, the user can intuitively sense whether there is display interface freeze on the screen. Therefore, in this case, the terminal may control the scheduling speed of the broadcast scheduling events, to avoid screen freeze caused by an excessively large quantity of simultaneously processed broadcast scheduling events.

With reference to the first aspect and the possible implementations of the first aspect, in another possible implementation, that a display interface of the terminal is changing includes at least one of the terminal detects a touch event of the user, an application is being started on the terminal, a video is being played on the terminal, a video call is being made on the terminal, a video is being recorded on the terminal, and an image is being shot on the terminal.

In other words, when the terminal detects these scenarios, it may be considered that the user is interacting with the terminal screen, so that the scheduling speed of the broadcast scheduling events can be controlled when the quantity of broadcast scheduling events is greater than or equal to the first preset value.

With reference to any one of the first aspect or the possible implementations of the first aspect, in another possible implementation, the controlling, by a terminal, a scheduling speed of broadcast scheduling events includes: grouping, by the terminal, the broadcast scheduling events into at least two groups; and for each of the at least two groups, scheduling, by the terminal, a broadcast scheduling event in the group based on one scheduling speed or at least one scheduling interval corresponding to the group.

In this way, the terminal may group the broadcast scheduling events into the at least two groups, and process the broadcast scheduling events in different groups at different speeds by using scheduling speeds or scheduling intervals corresponding to the groups, to defer a scheduling process of the broadcast scheduling events, reduce a quantity of simultaneously processed broadcast scheduling events, and implement stagger scheduling, thereby suppressing a broadcast storm, resolving a screen freeze problem during interaction between the user and the screen, and improving usage experience of the user.

With reference to the first aspect and the possible implementations of the first aspect, in another possible implementation, the grouping, by the terminal, the broadcast scheduling events into at least two groups includes: grouping, by the terminal, the broadcast scheduling events into the at least two groups based on priorities of receivers corresponding to the broadcast scheduling events.

With reference to the first aspect and the possible implementations of the first aspect, in another possible implementation, priorities of the groups are positively correlated with the priorities of the receivers.

In this way, a higher priority of a receiver indicates a higher priority of a group to which the receiver belongs.

With reference to the first aspect and the possible implementations of the first aspect, in another possible implementation, the method further includes: when the priorities of the receivers are changed, adjusting, by the terminal based on changed priorities of the receivers, the groups to which the broadcast scheduling events corresponding to the receivers belong.

In this way, the terminal can adjust, in a timely manner based on a current priority of a receiver, a group to which the receiver belongs, so that a high-priority receiver is corresponding to a high-priority group, and a low-priority receiver is corresponding to a low-priority group.

With reference to the first aspect and the possible implementations of the first aspect, in another possible implementation, the receivers include a foreground application and a background application, and a priority of the foreground application is higher than a priority of the background application.

Because the foreground application is an application that is currently running on the terminal in the foreground, the priority of the foreground application is higher.

With reference to the first aspect and the possible implementations of the first aspect, in another possible implementation, the receivers include an application that is frequently used and an application that is not frequently used, and a priority of the application that is frequently used is higher than a priority of the application that is not frequently used.

With reference to the first aspect and the possible implementations of the first aspect, in another possible implementation, a priority of a foreground application and a priority of a foreground-associated application are higher than a priority of a background application, the priority of the background application is higher than a priority of an application that is other than the foregoing applications and that is frequently used, the priority of the application that is frequently used is higher than a priority of a system application other than the foregoing applications, and the priority of the system application is higher than a priority of a three-party application other than the foregoing applications.

In this way, the terminal may prioritize the receivers based on importance of the receivers at a current moment, so that a receiver with higher importance is corresponding to a higher priority, and a receiver with lower importance is corresponding to a lower priority.

With reference to the first aspect and the possible implementations of the first aspect, in another possible implementation, when each group is corresponding to one scheduling speed, a high-priority group is corresponding to a high scheduling speed; when each group is corresponding to at least one scheduling interval, at least one scheduling interval corresponding to a high-priority group is small.

In this way, a broadcast scheduling event in a higher-priority group can be scheduled more quickly.

With reference to the first aspect and the possible implementations of the first aspect, in another possible implementation, each group is corresponding to one preset scheduling speed or one preset scheduling interval.

In this way, the terminal can schedule a broadcast scheduling event in a group at a constant speed by using a simple implementation.

With reference to the first aspect and the possible implementations of the first aspect, in another possible implementation, each group is corresponding to one preset duration, and when each group is corresponding to at least one scheduling interval, for any one of the at least two groups, the scheduling, by the terminal, a broadcast scheduling event in the group based on the at least one scheduling interval corresponding to the group includes: first, determining, by the terminal based on the preset duration corresponding to the group, an occurrence moment of the broadcast scheduling event in the group, and a current moment, the at least one scheduling interval corresponding to the group; and then, scheduling, by the terminal, the broadcast scheduling event in the group based on the at least one scheduling interval corresponding to the group.

In this way, the terminal can dynamically determine the scheduling interval based on the preset duration corresponding to the group, the occurrence moment of the broadcast scheduling event, and the current moment, so as to dynamically schedule the broadcast scheduling event in the group.

With reference to the first aspect and the possible implementations of the first aspect, in another possible implementation, a high-priority group is corresponding to short preset duration. Preset duration corresponding to a group may be considered as maximum duration in which a broadcast in the group is allowed to be buffered in a queue corresponding to the group.

In this way, a broadcast scheduling event in a higher-priority group can be scheduled more quickly.

With reference to the first aspect and the possible implementations of the first aspect, in another possible implementation, the determining, by the terminal based on the preset duration corresponding to the group, an occurrence moment of the broadcast scheduling event in the group, and a current moment, the at least one scheduling interval corresponding to the group includes: calculating, by the terminal based on Expression 1, a scheduling interval corresponding to each broadcast scheduling event in the group, where Expression 1 is $\Delta t_i = (T_0 + T_i - T_c)/(i+1)$, where $\Delta t_i$ represents a scheduling interval corresponding to an $i^{th}$ broadcast scheduling event in the group, $T_0$ represents the preset duration corresponding to the group, $T_i$ represents an occurrence moment of the $i^{th}$ broadcast scheduling event in the group, and $T_c$ represents the current moment; and the scheduling, by the terminal, the broadcast scheduling event in the group based on the at least one scheduling interval includes: selecting, by the terminal, a smallest scheduling interval from the scheduling interval corresponding to each broadcast scheduling event; and then scheduling, by the terminal, each broadcast scheduling event in the group based on the smallest scheduling interval.

In this way, the terminal can dynamically determine one smallest scheduling interval based on the preset duration, the occurrence moment of the broadcast scheduling event, and the current moment, so as to schedule the broadcast scheduling event in the group based on the smallest scheduling interval.

With reference to the first aspect and the possible implementations of the first aspect, in another possible implementation, the determining, by the terminal based on the preset duration corresponding to the group, an occurrence moment of the broadcast scheduling event in the group, and a current moment, the at least one scheduling interval corresponding to the group includes: calculating, by the terminal based on Expression 1, a scheduling interval corresponding to each broadcast scheduling event in the group, where Expression 1 is $\Delta t_i = (T_0 + T_i - T_c)/(i+1)$, where $\Delta t_i$ represents a scheduling interval corresponding to an $i^{th}$ broadcast scheduling event in the group, $T_0$ represents the preset duration corresponding to the group, $T_i$ represents an occurrence moment of the $i^{th}$ broadcast scheduling event in the group, and $T_c$ represents the current moment; and the scheduling, by the terminal, the broadcast scheduling event in the group based on the at least one scheduling interval includes: successively scheduling, by the terminal, the broadcast scheduling event corresponding to each scheduling interval, in ascending order of the scheduling interval corresponding to each broadcast scheduling event.

In this way, a magnitude of the scheduling interval is correlated with the occurrence moment of the broadcast scheduling event, and the terminal can more quickly distribute a broadcast corresponding to a broadcast scheduling event with an earlier occurrence moment.

With reference to the first aspect and the possible implementations of the first aspect, in another possible implementation, the determining, by the terminal based on the preset duration corresponding to the group, an occurrence moment of the broadcast scheduling event in the group, and a current moment, the at least one scheduling interval corresponding to the group includes: calculating, by the terminal based on Expression 2, one scheduling interval corresponding to the group, where Expression 2 is $\Delta t=T_0/N$, where $\Delta t$ represents the scheduling interval corresponding to the broadcast scheduling event in the group, $T_0$ represents the preset duration corresponding to the group, and N represents a quantity of broadcast scheduling events included in the group; and the scheduling, by the terminal, the broadcast scheduling event in the group based on the at least one scheduling interval includes: scheduling, by the terminal, each broadcast scheduling event in the group based on the one scheduling interval.

In this way, the terminal can determine a scheduling interval based on an actual quantity of broadcast scheduling events in a current group, so as to dynamically adjust the scheduling interval.

With reference to the first aspect and the possible implementations of the first aspect, in another possible implementation, the method further includes: if a broadcast scheduling event is added to the group, re-calculating, by the terminal, at least one scheduling interval corresponding to each broadcast scheduling event in the group.

In this case, when a broadcast scheduling event is added to the group, the scheduling interval is also changed. Therefore, a scheduling interval in a current status needs to be re-calculated.

With reference to any one of the first aspect or the possible implementations of the first aspect, in another possible implementation, the method further includes: when a second preset condition is met, stopping, by the terminal, controlling the scheduling speed of the broadcast scheduling events. The second preset condition includes at least one of a quantity of broadcast scheduling events in a preset time window is less than a second preset value, a screen blacks out, and the screen is turned on and a time in which the display interface does not change is greater than or equal to a third preset value.

When the quantity of broadcast scheduling events in the current preset time window is less than the second preset value, it may indicate that the current quantity of broadcast scheduling events is not very large, and a broadcast storm is impossible currently. When the screen blacks out, or the screen is turned on and the time in which the screen interface does not change is greater than or equal to the third preset value, it may indicate that the user has stopped interacting with the terminal screen. In this case, the terminal may stop controlling the scheduling speed of the broadcast scheduling events.

With reference to the first aspect and the possible implementations of the first aspect, in another possible implementation, after the terminal stops grouping the broadcast scheduling events into the at least two groups, the method further includes: scheduling, by the terminal without an interval, broadcast scheduling events that have been grouped into the groups.

In other words, after the terminal stops grouping the broadcast scheduling events into the at least two groups, it may indicate that a broadcast storm is impossible currently, or that the user has stopped interacting with the terminal screen, and the terminal can schedule the broadcast scheduling events in the groups as quickly as possible.

According to a second aspect, an embodiment of this application provides a terminal, including: a screen, configured to present a display interface; and a scheduling unit, configured to: when a first preset condition is met, control a scheduling speed of broadcast scheduling events. The first preset condition includes that a quantity of broadcast scheduling events in a preset time window is greater than or equal to a first preset value. The broadcast scheduling event is distributing a broadcast to a receiver, and the receiver includes at least one of software, a component, or a program.

With reference to the second aspect, in a possible implementation, the broadcast is a broadcast in an Android system.

With reference to the second aspect or the possible implementation of the second aspect, in another possible implementation, the first preset condition further includes that the display interface of the terminal is changing.

With reference to the second aspect and the possible implementations of the second aspect, in another possible implementation, that the display interface of the terminal is changing includes at least one of the terminal detects a touch event of a user, an application is being started on the terminal, a video is being played on the terminal, a video call is being made on the terminal, a video is being recorded on the terminal, and an image is being shot on the terminal.

With reference to any one of the second aspect or the possible implementations of the second aspect, in another possible implementation, the terminal further includes a grouping unit, configured to group the broadcast scheduling events into at least two groups. The scheduling unit is further configured to: for each of the at least two groups, schedule, for the terminal, a broadcast scheduling event in the group based on one scheduling speed or at least one scheduling interval corresponding to the group.

With reference to the second aspect and the possible implementations of the second aspect, in another possible implementation, the grouping unit is specifically configured to group the broadcast scheduling events into the at least two groups based on priorities of receivers corresponding to the broadcast scheduling events.

With reference to the second aspect and the possible implementations of the second aspect, in another possible implementation, priorities of the groups are positively correlated with the priorities of the receivers.

With reference to the second aspect and the possible implementations of the second aspect, in another possible implementation, the terminal further includes an adjustment unit, configured to: when the priorities of the receivers are changed, adjust, based on changed priorities of the receivers, the groups to which the broadcast scheduling events corresponding to the receivers belong.

With reference to the second aspect and the possible implementations of the second aspect, in another possible implementation, the receivers include a foreground application and a background application, and a priority of the foreground application is higher than a priority of the background application.

With reference to the second aspect and the possible implementations of the second aspect, in another possible implementation, the receivers include an application that is frequently used and an application that is not frequently used, and a priority of the application that is frequently used is higher than a priority of the application that is not frequently used.

With reference to the second aspect and the possible implementations of the second aspect, in another possible implementation, a priority of a foreground application and a priority of a foreground-associated application are higher than a priority of a background application, the priority of the background application is higher than a priority of an application that is other than the foregoing applications and that is frequently used, the priority of the application that is frequently used is higher than a priority of a system application other than the foregoing applications, and the priority of the system application is higher than a priority of a three-party application other than the foregoing applications.

With reference to the second aspect and the possible implementations of the second aspect, in another possible implementation, when each group is corresponding to one scheduling speed, a high-priority group is corresponding to a high scheduling speed; when each group is corresponding to at least one scheduling interval, at least one scheduling interval corresponding to a high-priority group is small.

With reference to the second aspect and the possible implementations of the second aspect, in another possible implementation, each group is corresponding to one preset scheduling speed or one preset scheduling interval.

With reference to the second aspect and the possible implementations of the second aspect, in another possible implementation, each group is corresponding to one preset duration, and when each group is corresponding to at least one scheduling interval, the scheduling unit is specifically configured to: determine, based on the preset duration corresponding to the group, an occurrence moment of the broadcast scheduling event in the group, and a current moment, the at least one scheduling interval corresponding to the group; and schedule the broadcast scheduling event in the group based on the at least one scheduling interval corresponding to the group.

With reference to the second aspect and the possible implementations of the second aspect, in another possible implementation, a high-priority group is corresponding to short preset duration.

With reference to the second aspect and the possible implementations of the second aspect, in another possible implementation, the scheduling unit is specifically configured to: calculate, based on Expression 1, a scheduling interval corresponding to each broadcast scheduling event in the group, where Expression 1 is $\Delta t_i=(T_0+T_i-T_c)/(i+1)$, where $\Delta t_i$ represents a scheduling interval corresponding to an $i^{th}$ broadcast scheduling event in the group, $T_0$ represents the preset duration corresponding to the group, $T_i$ represents an occurrence moment of the $i^{th}$ broadcast scheduling event in the group, and $T_c$ represents the current moment; select a smallest scheduling interval from the scheduling interval corresponding to each broadcast scheduling event; and schedule each broadcast scheduling event in the group based on the smallest scheduling interval.

With reference to the second aspect and the possible implementations of the second aspect, in another possible implementation, the scheduling unit is specifically configured to: calculate, based on Expression 1, a scheduling interval corresponding to each broadcast scheduling event in the group, where Expression 1 is $\Delta t_i=(T_0+T_i-T_c)/(i+1)$, where $\Delta t_i$ represents a scheduling interval corresponding to an $i^{th}$ broadcast scheduling event in the group, $T_0$ represents the preset duration corresponding to the group, $T_i$ represents an occurrence moment of the $i^{th}$ broadcast scheduling event in the group, and $T_c$ represents the current moment; and successively schedule the broadcast scheduling event corresponding to each scheduling interval, in ascending order of the scheduling interval corresponding to each broadcast scheduling event.

With reference to the second aspect and the possible implementations of the second aspect, in another possible implementation, the scheduling unit is specifically configured to: calculate, based on Expression 2, one scheduling interval corresponding to the group, where Expression 2 is $\Delta t=T_0/N$, where $\Delta t$ represents the scheduling interval corresponding to the broadcast scheduling event in the group, $T_0$ represents the preset duration corresponding to the group, and N represents a quantity of broadcast scheduling events included in the group; and schedule each broadcast scheduling event in the group based on the one scheduling interval.

With reference to the second aspect and the possible implementations of the second aspect, in another possible implementation, the scheduling unit is further configured to: if a broadcast scheduling event is added to the group, re-calculate at least one scheduling interval corresponding to each broadcast scheduling event in the group.

With reference to any one of the second aspect or the possible implementations of the second aspect, in another possible implementation, the scheduling unit is further configured to: when a second preset condition is met, stop controlling the scheduling speed of the broadcast scheduling events, where the second preset condition includes at least one of a quantity of broadcast scheduling events in a preset time window is less than a second preset value, a screen blacks out, and the screen is turned on and a time in which the display interface does not change is greater than or equal to a third preset value.

With reference to the second aspect and the possible implementations of the second aspect, in another possible implementation, the scheduling unit is further configured to: after the grouping unit stops grouping the broadcast scheduling events into the at least two groups, schedule, without an interval, broadcast scheduling events that have been grouped into the groups.

According to a third aspect, an embodiment of this application provides a terminal, including: a processor, a memory, a bus, and a communications interface, where the processor and the memory are connected by using the bus; the memory is configured to store a computer executable instruction; and when the terminal runs, the processor executes the computer executable instruction stored in the memory, so that the terminal executes the scheduling method in any possible implementation of the first aspect.

According to a fourth aspect, an embodiment of this application provides a computer readable storage medium, configured to store a computer software instruction used for the terminal. When the computer software instruction runs on a computer, the computer is enabled to execute the scheduling method in any possible implementation of the first aspect.

According to a fifth aspect, an embodiment of this application provides a computer program product including an instruction. When the computer program product runs on a computer, the computer is enabled to execute the scheduling method in any possible implementation of the first aspect.

For beneficial effects of the second aspect to the fifth aspect, refer to related descriptions in the first aspect.

BRIEF DESCRIPTION OF DRAWINGS

FIG. 2 is a schematic structural diagram of a mobile phone according to an embodiment of this application;

FIG. 3 is a flowchart of a scheduling method according to an embodiment of this application;

FIG. 4 is a schematic diagram of a preset time window according to an embodiment of this application;

DESCRIPTION OF EMBODIMENTS

Figure 1A:
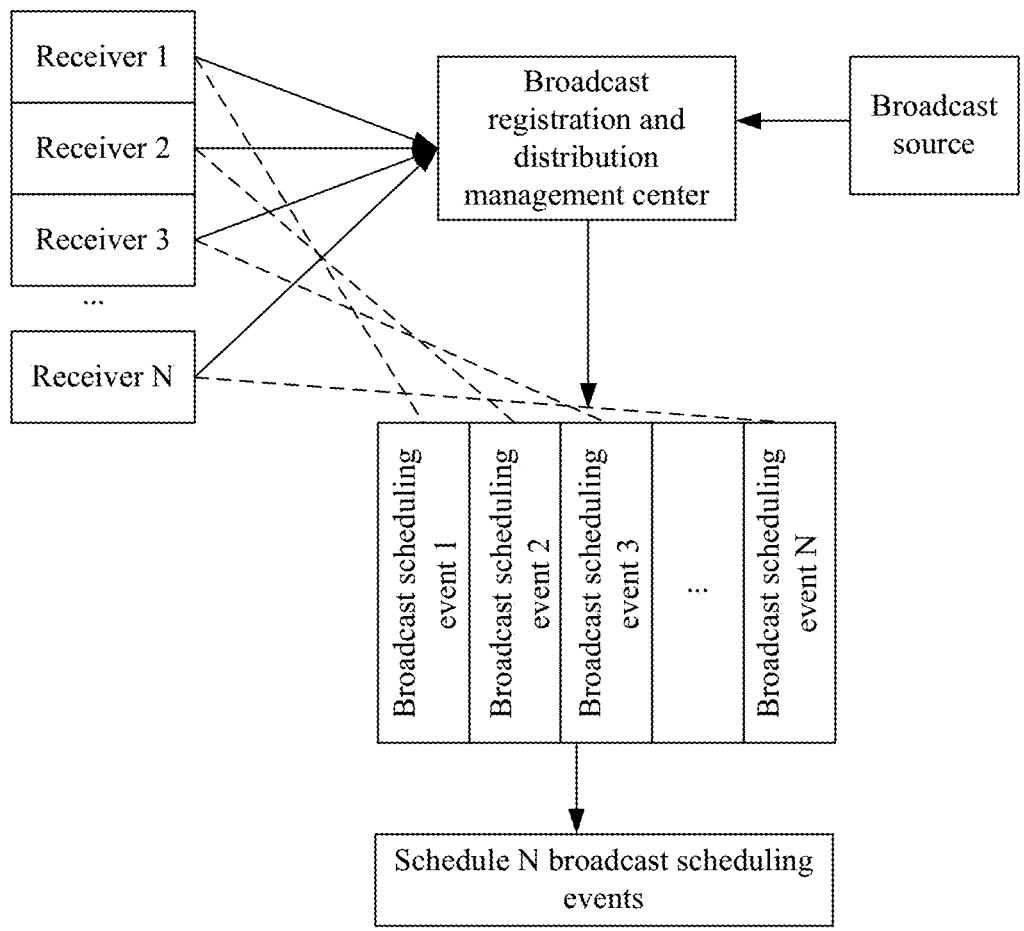
FIG. 1a is a flowchart of a scheduling method in the prior art.

For ease of understanding, descriptions about some concepts related to the embodiments of this application are provided below as examples for reference.

An application includes software, a program, a component, and the like.

A broadcast is sent by a sender, and is used to notify a receiver of some related status information.

A sender is a system or an application that sends a broadcast.

A receiver is an application that has been registered for a broadcast, and is configured to receive the broadcast and process a related service. The receiver may be dynamically registered for a broadcast in code, or may be statically registered for a broadcast in Manifest.xml.

A broadcast scheduling event is an event of distributing a broadcast to a receiver.

A broadcast storm occurs when a quantity of simultaneously processed broadcast scheduling events is excessively large and a system calculation resource shortage is caused.

A time window is a continuous time window having a fixed time length.

An interface, namely, a user interface (user interface, UI) is a graphics status presented on a display screen in front of a user.

When a status of a terminal is changed, for example, the terminal starts up or a network of the terminal is changed, a system or an application may send a broadcast, to notify a receiver of status information of a terminal change. One broadcast sent by a broadcast sender may be corresponding to a plurality of receivers that have been registered for the broadcast. For example, a CONNECTIVITY_CHANGE broadcast is relatively frequently registered by applications, and all applications related to a network status have been registered for the broadcast. Generally, for one CONNECTIVITY_CHANGE broadcast, hundreds of receivers may wait to process a service related to the broadcast. To be specific, one CONNECTIVITY_CHANGE broadcast may be corresponding to hundreds of broadcast scheduling events that need to be scheduled (one broadcast scheduling event is corresponding to one broadcast and one receiver). When a network signal is unstable or network handover is frequent, the CONNECTIVITY_CHANGE broadcast occurs very frequently, and there may be up to 700 CONNECTIVITY_CHANGE broadcasts per second. In this case, a quantity of broadcast scheduling events may be up to a product of the 700 broadcasts and the hundreds of receivers. That is, the terminal needs to schedule tens of thousands of broadcast scheduling events in a short time. As a result, a broadcast storm is very likely to occur, and this causes a series of problems such as terminal screen freeze and an excessively slow processing speed. Consequently, usage experience of a user becomes poor.

It should be noted that the broadcast in the embodiments of this application may be a parallel broadcast. Different from an ordered broadcast, when one parallel broadcast occurs, the terminal needs to schedule all broadcast scheduling events corresponding to the broadcast, and a scheduling process of broadcast scheduling events corresponding to the broadcast (such as a broadcast corresponding to a terminal startup status) does not cause self-starting of an application on the terminal.

The terminal provided in the embodiments of this application may control a scheduling speed of broadcast scheduling events when there are a specific quantity of broadcast scheduling events, to defer a processing process of the broadcast scheduling events, reduce a quantity of simultaneously processed broadcast scheduling events, and suppress a broadcast storm, thereby preventing the terminal from suffering a series of problems such as screen freeze and processing speed slowdown, and improving usage experience of a user.

The following describes the technical solutions in the embodiments of this application with reference to the accompanying drawings in the embodiments of this application. In descriptions of the embodiments of this application, unless otherwise specified, "/" means "or". For example, A/B may represent A or B. The "and/or" in this specification describes only an association relationship for describing associated objects and represents that three relationships may exist. For example, A and/or B may represent the following three cases: Only A exists, both A and B exist, and only B exists. In addition, in the descriptions of the embodiments of this application, "a plurality of" means two or more than two.

It should be noted that the scheduling method provided in the embodiments of this application is applicable to various terminal devices, for example, devices such as a mobile phone, a tablet computer, a notebook computer, an ultra-mobile personal computer (ultra-mobile personal computer, UMPC), a netbook, or a personal digital assistant (personal digital assistant, PDA). Specifically, the terminal may be a touchscreen device or a non-touchscreen device.

Specifically, the scheduling method provided in the embodiments of this application is described by using an example in which the terminal is a mobile phone. The following describes components of a mobile phone 10 in detail with reference to an accompanying drawing.

As shown in FIG. 2, the mobile phone 10 may include components such as a screen 11, a processor 12, a memory 13, a power supply 14, a radio frequency (Radio Frequency, RF) circuit 15, a gravity sensor 16, an audio circuit 17, a loudspeaker 18, and a microphone 19. These components may be connected to each other by using a bus, or may be directly connected to each other. A person skilled in the art may understand that a structure of the mobile phone shown in FIG. 2 constitutes no limitation on the mobile phone, and the mobile phone may include more components than those shown in FIG. 2, or a combination of some components, or components disposed differently.

The screen 11 may be a display panel, and is configured to present a display interface. The screen 11 may alternatively be a touch display panel, and is configured to implement input and output functions of the mobile phone 10, and may collect a touch operation of a user on or near the screen 11 (for example, an operation performed by the user on the screen 11 or near the screen 11 by using any suitable object or accessory such as a finger or a stylus), and drive a corresponding connection apparatus according to a preset program. The screen 11 may be further configured to display information input by the user or information provided for the user (such as an image collected by using a camera), and various menus of the mobile phone. For example, the screen 11 may be implemented in a plurality of types, such as a resistive type, a capacitive type, an infrared light-sensitive type, and an ultrasonic wave type, and this is not limited in this embodiment of this application. An operation of the user near the screen 11 may be referred to as hover touch control, and a display on which hover touch control can be performed may be implemented in types such as a capacitive type, an infrared light-sensitive type, and an ultrasonic wave type.

The processor 12 is a control center of the mobile phone 10, connects all parts of the entire mobile phone by using various interfaces and circuits, and executes various functions of the mobile phone 10 and processes data by running or executing a software program and/or a module stored in the memory 13 and by calling data stored in the memory 13, so as to perform overall monitoring on the mobile phone 10. In specific implementation, in an embodiment, the processor 12 may include one or more processing units. An application processor and a modem processor may be integrated into the processor 12. The application processor mainly processes an operating system, a user interface, an application program, and the like. The modem processor mainly processes wireless communication. It can be understood that the modem processor may alternatively not be integrated into the processor 12.

It can be understood that in this embodiment of this application, in another implementable manner, the screen 11 may be further configured to determine a touch object based on a touch operation of the user on the screen 11, and report the touch object to the processor 12, so that the processor 12 performs further processing.

The memory 13 may be configured to store data, a software program, and a module, and may be a volatile memory (volatile memory), such as a random-access memory (random-access memory, RAM), a non-volatile memory (non-volatile memory), such as a read-only memory (read-only memory, ROM), a flash memory (flash memory), a hard disk drive (hard disk drive, HDD), or a solid-state drive (solid-state drive, SSD), or a combination of the foregoing types of memories. Specifically, the memory 13 may store program code, where the program code is used to enable the processor 12 to execute, by executing the program code, the scheduling method provided in the embodiments of this application.

The power supply 14 may be a battery, and is logically connected to the processor 12 by using a power management system, so that functions such as charge management, discharge management, and power consumption management are implemented by using the power management system.

The RF circuit 15 may be configured to receive and send a signal in an information receiving or sending process or a call process, and in particular, send received information to the processor 12 for processing. In addition, the RF circuit 15 sends a signal that is generated by the processor 12. Generally, the RF circuit includes but is not limited to an antenna, at least one amplifier, a transceiver, a coupler, a low noise amplifier (low noise amplifier, LNA), a duplexer, and the like. In addition, the RF circuit 15 may further communicate with a network and another device through wireless communication.

The gravity sensor (gravity sensor) 16 may detect accelerations in all directions (three axes generally) of the mobile phone, may detect a magnitude and a direction of gravity when the mobile phone is static, and may be used for an application that recognizes a mobile phone posture (such as screen switching between portrait and landscape modes, a related game, and magnetometer posture calibration), a function related to vibration recognition (such as a pedometer or a knock), and the like. It should be noted that the mobile phone 10 may further include other sensors, such as a pressure sensor, a light sensor, a gyroscope, a barometer, a hygrometer, a thermometer, and an infrared sensor, and details are not described herein.

The audio circuit 17, the loudspeaker 18, and the microphone 19 may provide an audio interface between the user and the mobile phone 10. The audio circuit 17 may transmit an electrical signal converted from received audio data to the loudspeaker 18, and the loudspeaker 18 converts the electrical signal into an audio signal for output. In addition, the microphone 19 converts a collected audio signal into an electrical signal. The audio circuit 17 receives the electrical signal, converts the electrical signal into audio data, and then outputs the audio data to the RF circuit 15, so as to send the audio data to, for example, another mobile phone, or outputs the audio data to the processor 12 for further processing.

Although not shown, the mobile phone 10 may further include functional modules such as a Wireless Fidelity (wireless fidelity, WiFi) module, a Bluetooth module, and a camera. Details are not described herein.

To make the objective, technical solutions, and advantages of the embodiments of this application clearer, the following clearly describes the scheduling method provided in the embodiments of this application, with reference to the specific components in the mobile phone 10 shown in FIG. 2 and by using a flowchart of a scheduling method shown in FIG. 3. Steps shown in FIG. 3 may alternatively be performed in any terminal other than the mobile phone shown in FIG. 2. In addition, although a logic sequence of the scheduling method provided in the embodiments of this application is shown in the method flowchart, yet in some cases, the shown or described steps may be performed in a sequence different from the logic sequence.

Referring to FIG. 3, an embodiment of this application provides a scheduling method. The method may include the following step:

100. When a first preset condition is met, a terminal controls a scheduling speed of broadcast scheduling events, where the first preset condition includes that a quantity of broadcast scheduling events in a preset time window is greater than or equal to a first preset value, the broadcast scheduling event is distributing a broadcast to a receiver, and the receiver includes at least one of software, a component, or a program.

The broadcast herein is a parallel broadcast in an Android system. The preset time window herein is a continuous time period with duration of T, and the first preset value may be a threshold used by the terminal to predict whether a broadcast storm is to occur. The preset time window and the first preset value may be specifically set depending on an actual situation. For example, the duration of the preset time window T may be is, and the first preset value may be 60.

In this embodiment of this application, that a broadcast occurs is that a broadcast sender sends a broadcast, where the broadcast carries status information of the terminal. In actual application, a broadcast occurs randomly. The terminal cannot predetermine when a broadcast occurs or when a quantity of broadcast scheduling events increases. Therefore, the terminal may specifically determine, each time a broadcast occurs, whether a quantity of broadcast scheduling events in a current preset time window is greater than or equal to the first preset value. The current preset time window is a current moment and a continuous time period T prior to the current moment. If a quantity of broadcast scheduling events in the current preset time window is greater than or equal to the first preset value, it may be considered that the quantity of broadcast scheduling events is relatively large, and a broadcast storm is to occur.

For example, referring to FIG. 4, if the preset time window T is 1s, and the current moment is a moment 1, the current preset time window is the moment 1 and 1s prior to the moment 1; and if the current moment is a moment 2, the current preset time window is the moment 2 and 1s prior to the moment 2.

In another possible implementation, alternatively, the terminal may periodically determine whether a quantity of broadcast scheduling events in a current preset time window is greater than or equal to the first preset value.

In another possible implementation, the terminal may alternatively determine, after receiving indication information of a user, whether a quantity of broadcast scheduling events in a current preset time window is greater than or equal to the first preset value.

A receiver of a broadcast may be an application that has been registered for the broadcast, and the application may be specifically at least one of software, a program, or a component. One broadcast scheduling event may be corresponding to one broadcast and one receiver. One broadcast may be corresponding to a plurality of receivers, and in this case, the broadcast may be corresponding to a plurality of broadcast scheduling events. Different broadcasts may be corresponding to one receiver, and in this case, the receiver may be corresponding to a plurality of broadcast scheduling events. For example, for a correspondence between a broadcast scheduling event, a broadcast, and a receiver, reference may be made to Table 1.

TABLE 1

| Broadcast scheduling event | Broadcast | Receiver |
| --- | --- | --- |
| Broadcast scheduling event 1 | Broadcast 1 | Receiver 1 |
| Broadcast scheduling event 2 | Broadcast 1 | Receiver 2 |
| Broadcast scheduling event 3 | Broadcast 2 | Receiver 1 |
| . . . | . . . | . . . |

That a terminal controls a scheduling speed of broadcast scheduling events may include: the broadcast scheduling events may be buffered in a queue, and the terminal may schedule the broadcast scheduling events in the queue at equal intervals at a constant speed, or may schedule the broadcast scheduling events at a non-constant speed; and the terminal may schedule the broadcast scheduling events in the queue at a preset speed or interval, or may dynamically adjust the scheduling speed of the broadcast scheduling events. This is not specifically limited herein.

When the quantity of broadcast scheduling events in the preset time window is greater than or equal to the first preset value, the terminal may consider that the current quantity of broadcast scheduling events is relatively large. Therefore, the terminal may control the scheduling speed of the broadcast scheduling events, to extend a processing time of the broadcast scheduling events, and reduce a quantity of simultaneously processed broadcast scheduling events, instead of scheduling all broadcast scheduling events at one time in the prior art. In this way, a broadcast storm can be suppressed, and problems such as terminal screen freeze and processing speed slowdown caused by an excessively large quantity of simultaneously processed broadcast scheduling events can be avoided, so that usage experience of the user is improved.

Further, in addition to including that the quantity of broadcast scheduling events in the preset time window is greater than or equal to the first preset value, the first preset condition may further include that the user is using the terminal. When the user is using the terminal, if the quantity of simultaneously processed broadcast scheduling events is excessively large, the terminal may have problems such as screen freeze and processing speed slowdown, and this directly affects current usage experience of the user. Therefore, the terminal may control the scheduling speed of the broadcast scheduling events, to reduce the quantity of simultaneously processed broadcast scheduling events. Specifically, a scenario in which the user is using the terminal may include that a terminal screen is turned on or that the terminal screen blacks out but the terminal detects that music is being played or a broadcast (such as an FM broadcast) program is being played.

In another implementation, in addition to including that the quantity of broadcast scheduling events in the preset time window is greater than or equal to the first preset value, the first preset condition may further include that a display interface of the terminal is changing. When the display interface of the terminal is changing, it may indicate that the user is interacting with the terminal screen, and the user can intuitively sense whether screen display is smooth. If the quantity of simultaneously processed broadcast scheduling events is excessively large, a broadcast storm may occur, and this results in screen freeze. As a result, the display interface freezes on a current image without an update, and this makes the user feel that interface display is not smooth. Therefore, in this case, the terminal may control the scheduling speed of the broadcast scheduling events, to suppress the broadcast storm, resolve the problem of interface freeze, and ensure display smoothness.

A scenario in which the display interface of the terminal is changing, that is, a scenario in which the user is interacting with the terminal screen may include at least one of the following: the terminal detects a touch event of the user, an application is being started on the terminal, a video is being played on the terminal, a video call is being made on the terminal, a video is being recorded on the terminal, and an image is being shot on the terminal. The terminal may detect, by using a processing circuit, whether the terminal is currently in any of the foregoing scenarios. For example, the terminal may detect whether an application is being started on the terminal, or whether a video is being played on the terminal.

The touch event of the user may include an event such as tapping, sliding, touching and holding, dragging, or pinching the screen by the user. Specifically, the processing circuit in the terminal may determine, by using an input from a touch event detector, whether there is user interaction with the screen. In addition, the processing circuit may be further configured to: process the input from the touch event detector, to determine, by distinguishing one or more user knocks from another vibration and movement, whether there is user interaction with the screen. The application that is being started on the terminal may include various software and application programs supported by the terminal, for example, WeChat, Baidu, Facebook (facebook), Taobao, Alipay, navigation software, and various game apps, and no more examples are provided herein.

Figure 5A:
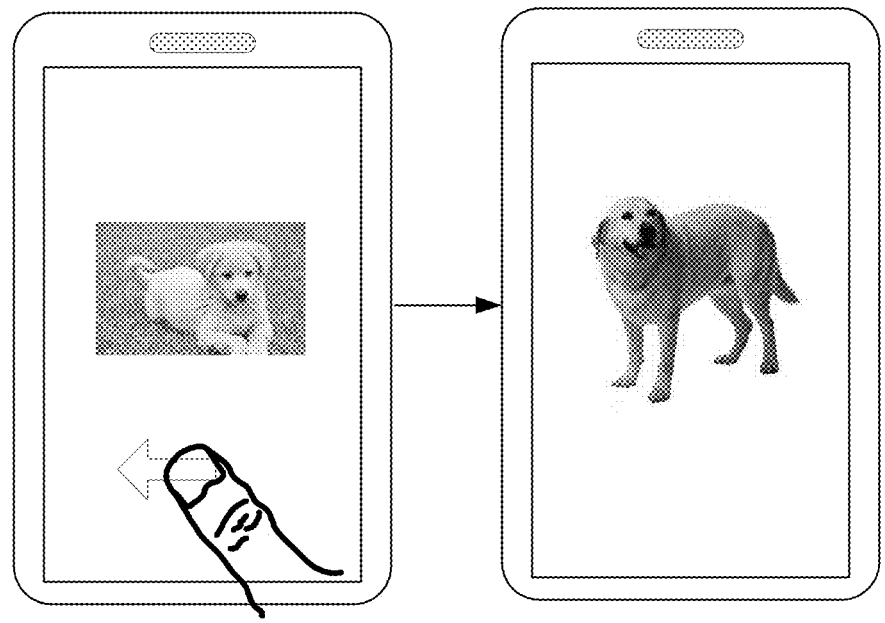
FIG. 5a is a schematic diagram of interaction between a user and a terminal screen according to an embodiment of this application.
Figure 5B:
FIG. 5b is another schematic diagram of interaction between a user and a terminal screen according to an embodiment of this application.
Figure 5C:
FIG. 5c is another schematic diagram of interaction between a user and a terminal screen according to an embodiment of this application.
Figure 5D:
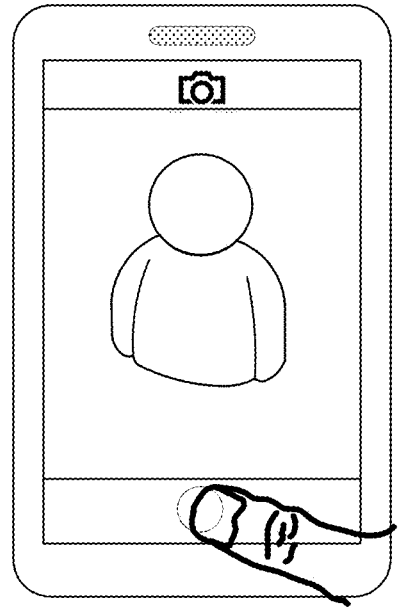
FIG. 5d is another schematic diagram of interaction between a user and a terminal screen according to an embodiment of this application.

For example, for a scenario in which a user slides a screen (a touch event) to browse a picture, reference may be made to FIG. 5a; for a scenario in which a user watches a video by using a screen, reference may be made to FIG. 5b; for a scenario in which a user makes a video chat by using a screen, reference may be made to FIG. 5c; and for a scenario in which a user shoots an image by using a screen, reference may be made to FIG. 5d.

In addition, before a changed interface is displayed, a graphics processing unit (graphics processing unit, GPU) in the terminal renders the display interface. Therefore, in a possible implementation, the terminal may monitor a rendering status of the GPU, to determine whether the display interface is changing.

In this embodiment of this application, if the first preset condition is met, the terminal may group the broadcast scheduling events in step 100, so as to separately process a broadcast scheduling event in each group. Step 100 may specifically include the following steps.

101. The terminal groups the broadcast scheduling events into at least two groups.

Each group may include at least one broadcast scheduling event. After the broadcast scheduling events are grouped into the at least two groups, for different groups, the terminal may schedule the broadcast scheduling events in the different groups in series, or may schedule the broadcast scheduling events in the different groups in parallel. This is not specifically limited herein.

The following provides descriptions by mainly using parallel scheduling as an example.

102. For each of the at least two groups, the terminal schedules a broadcast scheduling event in the group based on one scheduling speed or at least one scheduling interval corresponding to the group.

Figure 6:
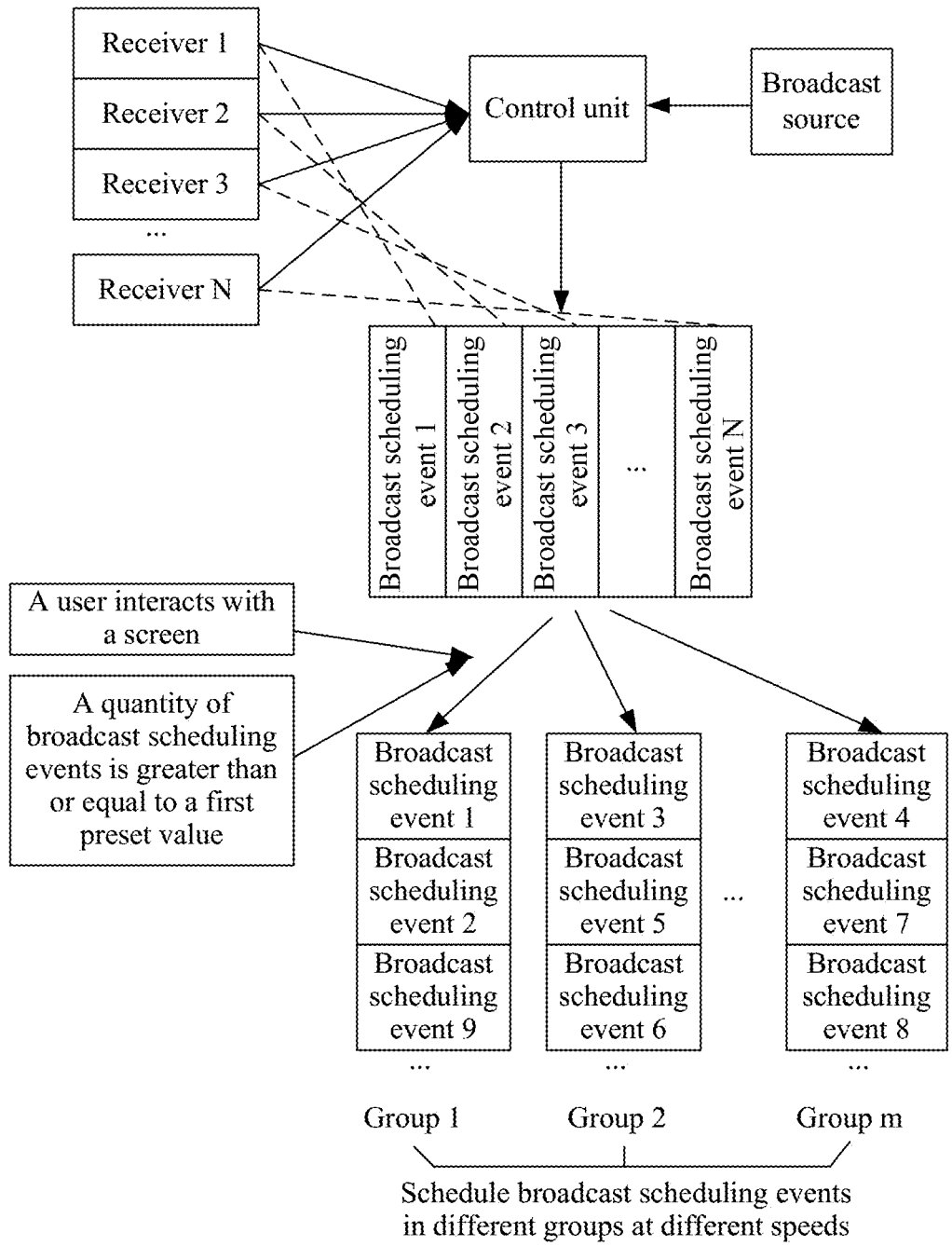
FIG. 6 is a flowchart of another scheduling method according to an embodiment of this application.

A scheduling interval is a time interval between scheduling of two broadcast scheduling events. For each group obtained through grouping, the terminal may schedule a broadcast scheduling event in the group based on one scheduling speed corresponding to the group or based on at least one scheduling interval corresponding to the group, so that a receiver in the broadcast scheduling event can process a broadcast-related service. For example, referring to FIG. 6, the terminal may schedule broadcast scheduling events in all groups in parallel at different speeds corresponding to the groups. In other words, the terminal may control a scheduling speed of a broadcast scheduling event in each group. Specifically, a control unit in FIG. 6 may be specifically a broadcast registration and distribution management center, and a broadcast source in FIG. 6 may be a system or an application that sends a broadcast.

Figure 1B:
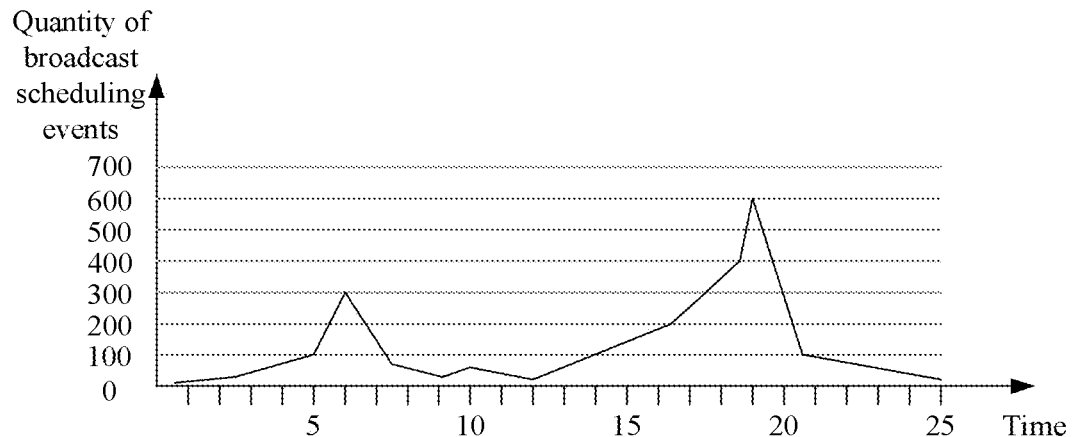
FIG. 1b is a relationship curve between time and a quantity of broadcast scheduling events in the prior art.

In this way, through speed control, the terminal may extend the processing time of the broadcast scheduling events, reduce the quantity of simultaneously processed broadcast scheduling events, and stagger scheduling processes of a plurality of broadcast scheduling events, so as to implement stagger scheduling, thereby avoiding a relatively large scheduling peak value shown in FIG. 1b that occurs because all broadcast scheduling events are scheduled at one time in the prior art.

Specifically, a first group of the at least two groups is used as an example, and the terminal may schedule a broadcast scheduling event in the first group based on one scheduling speed corresponding to the first group or based on at least one scheduling interval corresponding to the first group. If the broadcast scheduling event in the first group includes the broadcast scheduling event 1 in Table 1, that the terminal schedules the broadcast scheduling event 1 is: the terminal schedules the receiver 1 to process a service related to the broadcast 1. A broadcast scheduling event processing manner for another group of the at least two groups is similar to that for the first group, and details are not described herein again.

It should be noted that when each group is corresponding to one scheduling speed, the terminal may schedule the broadcast scheduling event in the group at a constant speed based on the scheduling speed. For example, if a scheduling speed corresponding to the first group is s1 broadcast scheduling events per second, the terminal may schedule s1 broadcast scheduling events in the first group in each second. When each group is corresponding to at least one scheduling interval, there may be specifically one or more scheduling intervals corresponding to the group, and this is not specifically limited in this embodiment of this application. When each group is corresponding to one scheduling interval, the terminal may schedule a broadcast scheduling event in the group at a constant speed based on the scheduling interval. For example, if a scheduling interval corresponding to the first group is Δt, the terminal may schedule one broadcast scheduling event in the first group at an interval of Δt.

In a possible implementation, each group may be corresponding to one preset scheduling speed, or each group may be corresponding to one preset scheduling interval. The terminal may schedule the broadcast scheduling event in the group at a constant speed based on the preset scheduling speed or the preset scheduling interval.

It is worth emphasizing that in this embodiment of this application, each group may be corresponding to one queue, the broadcast scheduling event in the group may be temporarily buffered in the queue corresponding to the group, and the terminal may schedule, based on the scheduling speed or the at least one scheduling interval corresponding to the group, the broadcast scheduling event that is buffered in the queue corresponding to the group.

In this embodiment of this application, when the user interacts with the terminal screen, and a broadcast storm is to occur, the terminal may group the broadcast scheduling events into the at least two groups, and schedule the broadcast scheduling event in each group based on the one scheduling speed or at least one scheduling interval corresponding to the group, so as to process the broadcast scheduling events in different groups at different speeds by using scheduling speeds or scheduling intervals respectively corresponding to the groups. This defers a scheduling process of the broadcast scheduling events, reduces the quantity of simultaneously processed broadcast scheduling events, and implements stagger scheduling, thereby suppressing the broadcast storm, and avoiding instantaneous system busyness that occurs because all broadcast scheduling events are scheduled at one time in the prior art. Therefore, problems such as display interface freeze during interaction between the user and the screen, a slow processing speed, quick power consumption, and large heat production can be effectively resolved, so that usage experience of the user can be improved.

Figure 7:
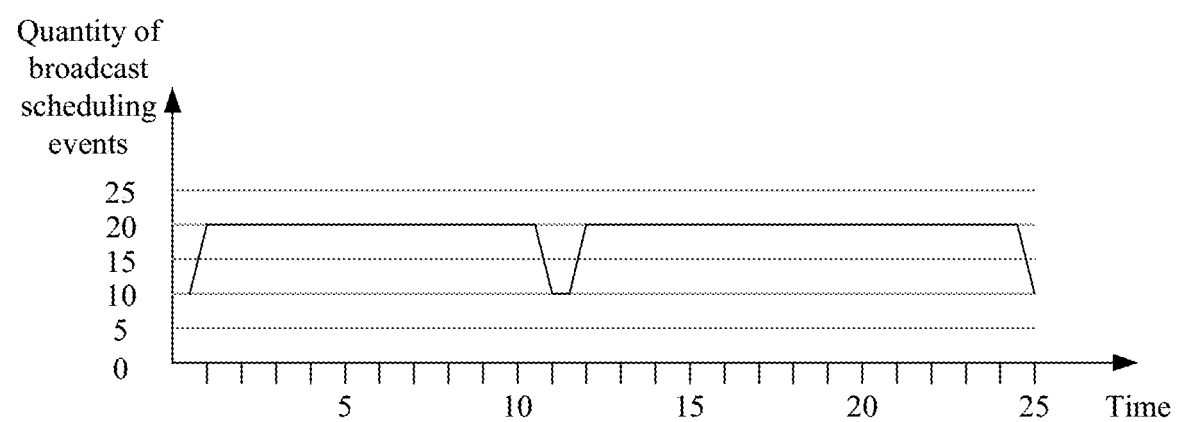
FIG. 7 is a relationship curve between time and a quantity of broadcast scheduling events according to an embodiment of this application.

For example, referring to an effect drawing shown in FIG. 7, according to the scheduling method provided in this embodiment of this application, a scheduling curve of the broadcast scheduling events may be made relatively gentle, and a relatively large peak value in the prior art shown in FIG. 1b does not occur.

In step 101, the terminal may group the broadcast scheduling events into the at least two groups in a plurality of manners. In a possible implementation, that the terminal groups the broadcast scheduling events into at least two groups may include the following step:

1010. The terminal groups the broadcast scheduling events into the at least two groups based on priorities of receivers corresponding to the broadcast scheduling events.

The terminal may group the broadcast scheduling events into different groups based on the priorities of the receivers corresponding to the broadcast scheduling events, so as to process the broadcast scheduling events in the different groups.

In one case, the priorities of the receivers are associated with importance of the receivers. The terminal may group the broadcast scheduling events into the different groups based on the importance of the receivers.

For example, the receivers may include a foreground application and a background application, importance of the foreground application is higher than importance of the background application, and a priority of the foreground application is higher than a priority of the background application.

For another example, the receivers may include an application that is frequently used and an application that is not frequently used, importance of the application that is frequently used is higher than importance of the application that is not frequently used, and a priority of the application that is frequently used is higher than a priority of the application that is not frequently used.

For another example, the importance of the receivers may be divided as follows: a foreground application and a foreground-associated application>a background application>an application that is other than the foreground applications and that is frequently used>a system application other than the foregoing applications>a three-party application other than the foregoing applications. ">" herein represents that importance of a former application is higher than importance of a latter application. The "application that is other than the foregoing applications and that is frequently used" is an application that is other than the foregoing foreground application, foreground-associated application, and background application and that is frequently used; the "system application other than the foregoing applications" is a system application other than the foregoing foreground application, foreground-associated application, background application, and application that is frequently used; and the "three-party application other than the foregoing applications" is a three-party application other than all of the foregoing applications.

Corresponding to the importance of the receivers, the priorities of the receivers may be divided as follows: the foreground application and the foreground-associated application>the background application>the application that is other than the foregoing applications and that is frequently used>the system application other than the foregoing applications>the three-party application other than the foregoing applications. ">" herein represents that a priority of a former application is higher than a priority of a latter application.

Corresponding to the priorities of the receivers, the terminal may group the receivers into five groups based on the priorities of the receivers: a group to which the foreground application and the foreground-associated application belong, a group to which the background application belongs, a group to which the application that is other than the foregoing applications and that is frequently used belongs, a group to which the system application other than the foregoing applications belongs, and a group to which the three-party application other than the foregoing applications belongs.

Further, when the priorities of the receivers are changed, the terminal may re-group the broadcast scheduling events into at least two groups based on changed priorities of the receivers. Alternatively, when the priorities of the receivers are changed, the terminal may adjust, based on changed priorities of the receivers, the groups to which the broadcast scheduling events corresponding to the receivers belong.

For example, when the importance of the receivers is changed, for example, a receiver is switched from the background to the foreground, so that a priority of the receiver is also changed, the terminal may adjust, based on changed importance of the receivers, the groups to which the broadcast scheduling events belong.

Still further, the groups to which the broadcast scheduling events belong may also be corresponding to different priorities, and a broadcast scheduling event in a high-priority group may be a broadcast scheduling event that needs to be scheduled as quickly as possible.

For example, when the terminal groups the broadcast scheduling events based on the priorities of the receivers, priorities of the groups may be positively correlated with the priorities of the receivers. In other words, a receiver with higher importance has a higher priority, and a group to which the receiver with higher importance belongs also has a higher priority. In other words, a broadcast scheduling event with higher importance needs to be scheduled more quickly, and therefore, a priority of a group to which the broadcast scheduling event belongs is also higher.

Specifically, referring to Table 2, corresponding to the priorities of the receivers in the foregoing example, priorities of the five groups to which the broadcast scheduling events belong may be: the group to which the foreground application and the foreground-associated application belong>the group to which the background application belongs>the group to which the application that is other than the foregoing applications and that is frequently used belongs>the group to which the system application other than the foregoing applications belongs>the group to which the three-party application other than the foregoing applications belongs. ">" herein represents that a priority of a former application is higher than a priority of a latter application.

TABLE 2

| Receiver | Receiver priority | Group | Group priority |
| --- | --- | --- | --- |
| Foreground application and foreground-associated application | 1 | Group 1 | 1 |
| Background application | 2 | Group 2 | 2 |
| Application that is other than the foregoing applications and that is frequently used | 3 | Group 3 | 3 |
| System application other than the foregoing applications | 4 | Group 4 | 4 |
| Three-party application other than the foregoing applications | 5 | Group 5 | 5 |

In Table 2, a priority 1>a priority 2>a priority 3>a priority 3>a priority 5.

Figure 8A:
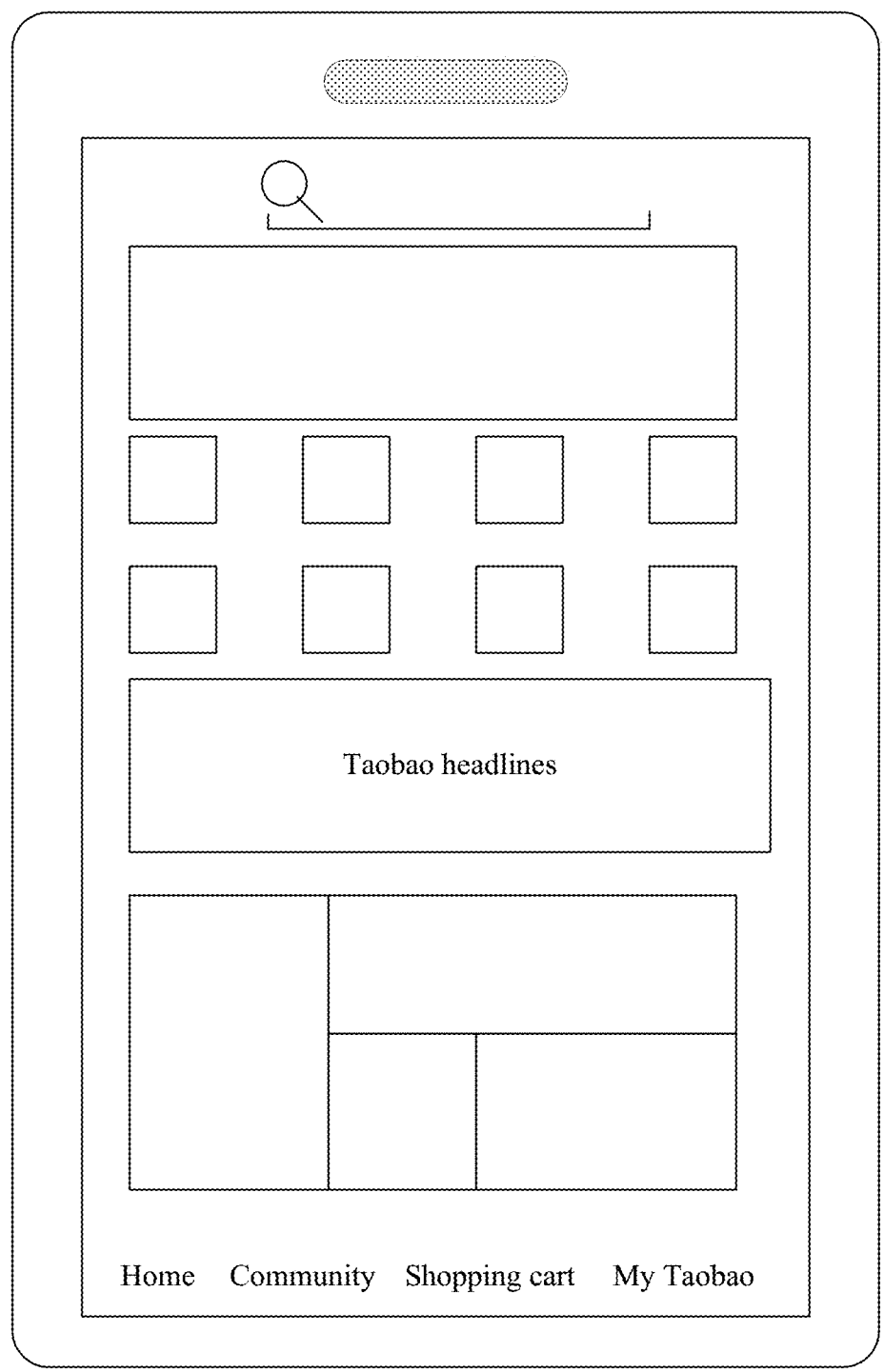
FIG. 8a is a schematic diagram of a terminal display interface according to an embodiment of this application.

For example, referring to FIG. 8a, the foreground application is Taobao, the application related to the foreground application includes Alipay, the background application includes WeChat and system background applications, the application that is frequently used by a user includes Facebook and Baidu Browser, and the terminal further supports other system applications such as Calculator, and other three-party applications such as Google (google) Maps. In this case, Taobao and Alipay may be corresponding to a priority-1 receiver and a priority-1 group in Table 2, WeChat and other system background applications may be corresponding to a priority-2 receiver and a priority-2 group in Table 2, Facebook and Baidu Browser may be corresponding to a priority-3 receiver and a priority-3 group in Table 2, Calculator may be corresponding to a priority-4 receiver and a priority-4 group in Table 2, and Google Maps may be corresponding to a priority-5 receiver and a priority-5 group in Table 2.

Figure 8B:
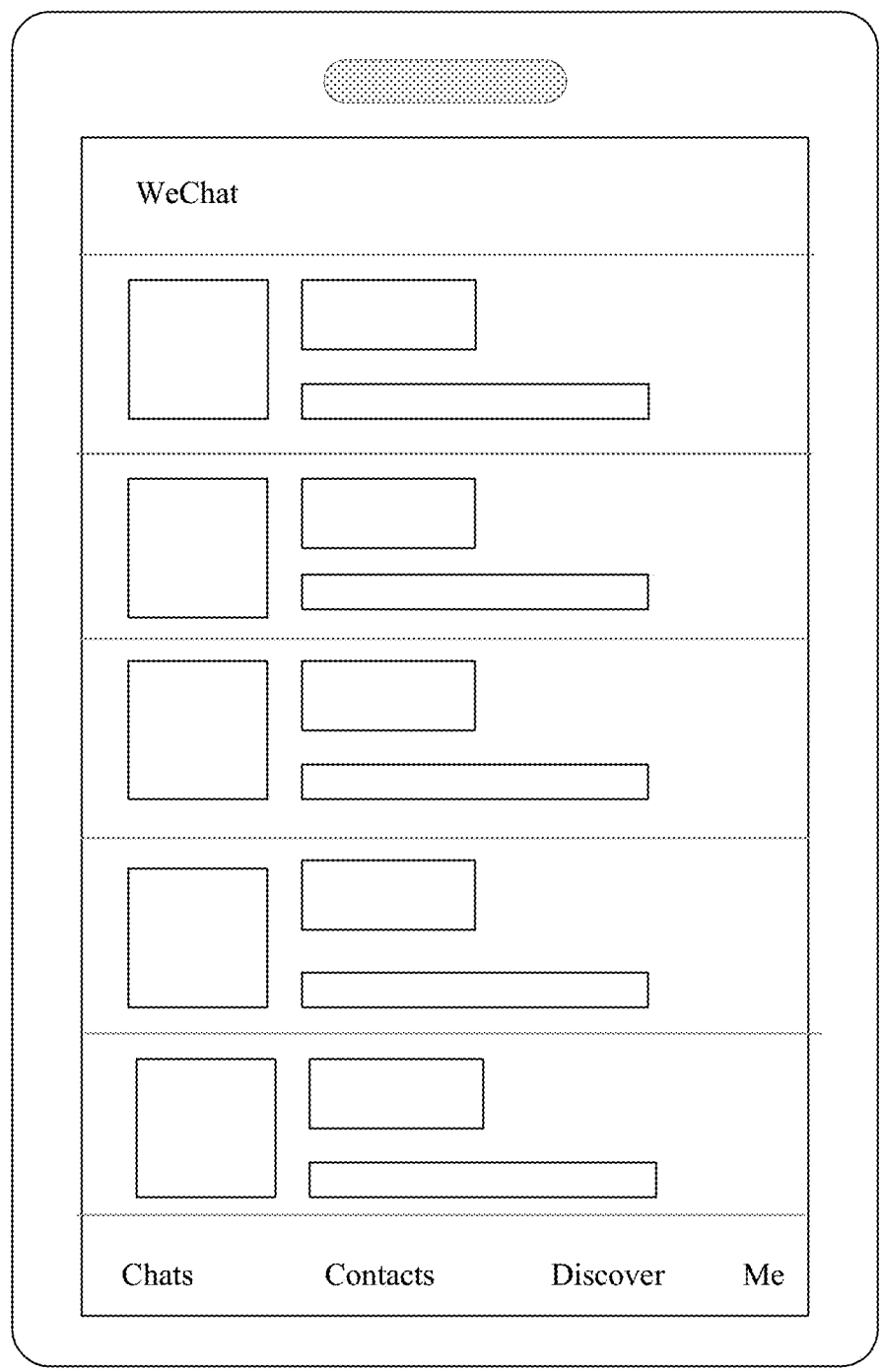
FIG. 8b is a schematic diagram of another terminal display interface according to an embodiment of this application.

Referring to FIG. 8b, when WeChat is switched from the background to the foreground, and Taobao is switched from the foreground to the background, WeChat may be corresponding to the priority-1 receiver and the priority-1 group in Table 2, and Taobao and Alipay may be corresponding to the priority-2 receiver and the priority-2 group in Table 2.

The foregoing division of the importance of the receivers is merely an example, and there may be a different division manner. Corresponding to the importance of the receivers, the receivers, namely, the groups to which the receivers belong may also be prioritized in a different manner. Details are not described herein.

In another possible implementation, that the terminal groups the broadcast scheduling events into at least two groups may include: the terminal may group a broadcast scheduling event corresponding to at least one receiver into one group. For example, the terminal may group a broadcast scheduling event corresponding to a receiver 1 into one group, and group a broadcast scheduling event corresponding to a receiver 2 into another group. For example, the terminal may alternatively group broadcast scheduling events corresponding to a receiver 1 and a receiver 2 into one group, and group broadcast scheduling events corresponding to a receiver 3 and a receiver 4 into another group.

In another possible implementation, that the terminal groups the broadcast scheduling events into at least two groups may include: the terminal may group a broadcast scheduling event corresponding to at least one broadcast into one group. For example, the terminal may group a broadcast scheduling event corresponding to a broadcast 1 into one group, and group a broadcast scheduling event corresponding to a broadcast 2 into another group. For example, the terminal may alternatively group broadcast scheduling events corresponding to a broadcast 1 and a broadcast 2 into one group, and group broadcast scheduling events corresponding to a broadcast 3 and a broadcast 4 into another group.

In another possible implementation, that the terminal groups the broadcast scheduling events into at least two groups may include: the terminal may group the broadcast scheduling events into the at least two groups in a chronological order of broadcast occurrence.

In another possible implementation, that the terminal groups the broadcast scheduling events into at least two groups may include: the terminal may randomly group the broadcast scheduling events into the at least two groups.

It can be understood that the terminal may alternatively group the broadcast scheduling events into the at least two groups in another manner, and no more examples are provided herein.

Manners of grouping the broadcast scheduling events are different, and manners of prioritizing the groups to which the broadcast scheduling events belong may also be different. For example, the terminal groups the broadcast scheduling events into three groups in a chronological order of broadcast occurrence, and a broadcast scheduling event with an earlier occurrence time needs to be scheduled more quickly.

Therefore, a priority of a group to which the broadcast scheduling event with an earlier occurrence time belongs is higher than a priority of a group to which a broadcast scheduling event with a later occurrence time belongs.

It should be noted that in this embodiment of this application, when each group is corresponding to one priority, in the case of serial scheduling, the terminal may preferentially process a broadcast scheduling event in a high-priority group, so that the broadcast scheduling event in the high-priority group is scheduled as quickly as possible; and in the case of parallel scheduling, the terminal may schedule broadcast scheduling events in all groups in parallel, and a high-priority group is corresponding to a high scheduling speed. The following provides descriptions still by mainly using parallel scheduling as an example.

Specifically, when each group is corresponding to one scheduling speed, a high-priority group is corresponding to a high scheduling speed; when each group is corresponding to at least one scheduling interval, at least one scheduling interval corresponding to a high-priority group is small. Because a broadcast scheduling event in a higher-priority group may need to be scheduled more quickly, by using a relatively high scheduling speed or a relatively small scheduling interval, the terminal may more quickly schedule the broadcast scheduling event in the higher-priority group.

If each group is corresponding to one preset scheduling speed, a preset scheduling speed corresponding to a high-priority group may be greater than a preset scheduling speed corresponding to a low-priority group; if each group is corresponding to one preset scheduling interval, a preset scheduling interval corresponding to a high-priority group may be less than a preset scheduling interval corresponding to a low-priority group. In this way, the terminal may more quickly schedule a broadcast scheduling event in the high-priority group.

For example, for a correspondence between a group in Table 2 and a preset scheduling speed, reference may be made to Table 3.

TABLE 3

| Group | Preset scheduling speed |
| --- | --- |
| Group 1 | S1 |
| Group 2 | S2 |
| Group 3 | S3 |
| Group 4 | S4 |
| Group 5 | S5 |

In Table 3, S1>S2>S3>S4>S5. For example, if S1, S2, S3, S4, and S5 are respectively six broadcast scheduling events per second, four broadcast scheduling events per second, three broadcast scheduling events per second, two broadcast scheduling events per second, and one broadcast scheduling event per second, for a schematic diagram of broadcast scheduling event scheduling corresponding to Table 2, reference may be made to FIG. 9. It can be learned from FIG. 9 that, a broadcast scheduling event in a higher-priority group may be scheduled more quickly.

For example, for a correspondence between a group in Table 2 and a preset scheduling interval, reference may be made to Table 4.

TABLE 4

| Group | Preset scheduling interval |
| --- | --- |
| Group 1 | $\Delta T1$ |
| Group 2 | $\Delta T2$ |
| Group 3 | $\Delta T3$ |
| Group 4 | $\Delta T4$ |
| Group 5 | $\Delta T5$ |

In Table 4, $\Delta T1<\Delta T2<\Delta T3<\Delta T4<\Delta T5$.

In this embodiment of this application, each group may be corresponding to one preset duration. When each group is corresponding to at least one scheduling interval, for any one of the at least two groups, step 102 in which the terminal schedules the broadcast scheduling event in the group based on the at least one scheduling interval corresponding to the group includes the following steps:

201. The terminal determines, based on the preset duration corresponding to the group, an occurrence moment of the broadcast scheduling event in the group, and a current moment, the at least one scheduling interval corresponding to the group.

202. The terminal schedules the broadcast scheduling event in the group based on the at least one scheduling interval corresponding to the group.

In step 201 and step 202, after a broadcast occurs (that is, the broadcast is sent by a sender), m broadcast scheduling events that are corresponding to the broadcast and that are in a one-to-one correspondence with m receivers of the broadcast are generated. In other words, after the broadcast occurs, a broadcast scheduling event also occurs. Therefore, an occurrence moment of the broadcast scheduling event may also be understood as an occurrence moment of the broadcast. The preset duration may be understood as a longest time in which the broadcast scheduling event is allowed to be buffered in a queue corresponding to the group, and may be specifically set depending on an actual need. The scheduling interval is correlated with the longest time in which the broadcast scheduling event is allowed to remain in the queue corresponding to the group. Further, longer duration between the occurrence moment of the broadcast scheduling event and the current moment indicates that the broadcast scheduling event needs to be scheduled more quickly. Therefore, the terminal may dynamically determine, based on the preset duration corresponding to the group, the occurrence moment of the broadcast scheduling event in the group, and the current moment, the at least one scheduling interval corresponding to the group, so as to schedule the broadcast scheduling event in the group based on the at least one scheduling interval.

It can be understood that in this embodiment of this application, a broadcast scheduling event in each group may be scheduled by using the method described in step 201 and step 202.

In a possible implementation, a higher-priority group is corresponding to shorter preset duration. In other words, a time in which a broadcast scheduling event is allowed to be buffered in a queue corresponding to the higher-priority group is shorter, and the broadcast scheduling event in the higher-priority group can be scheduled more quickly. The example in Table 2 is used as an example. For preset duration corresponding to the group 1 to the group 5, refer to Table 5.

TABLE 5

| Group | Preset duration |
| --- | --- |
| Group 1 | 10 ms |
| Group 2 | 15 ms |
| Group 3 | 20 ms |
| Group 4 | 25 ms |
| Group 5 | 30 ms |

Specifically, the terminal may implement step 201 and step 202 by using a plurality of methods, and this is described below by using examples.

In one method, step 201 may include:

301. The terminal calculates, based on Expression 1, a scheduling interval corresponding to each broadcast scheduling event in the group, where Expression 1 may be:

$$\Delta t_i = (T_0 + T_i - T_c)/(i+1) \quad \text{Expression 1}$$

where $\Delta t_i$ represents a scheduling interval corresponding to an $i^{th}$ broadcast scheduling event in the group, $T_0$ represents the preset duration corresponding to the group, $T_i$ represents an occurrence moment of the $i^{th}$ broadcast scheduling event in the group, and $T_c$ represents the current moment.

Figures 9, 10:
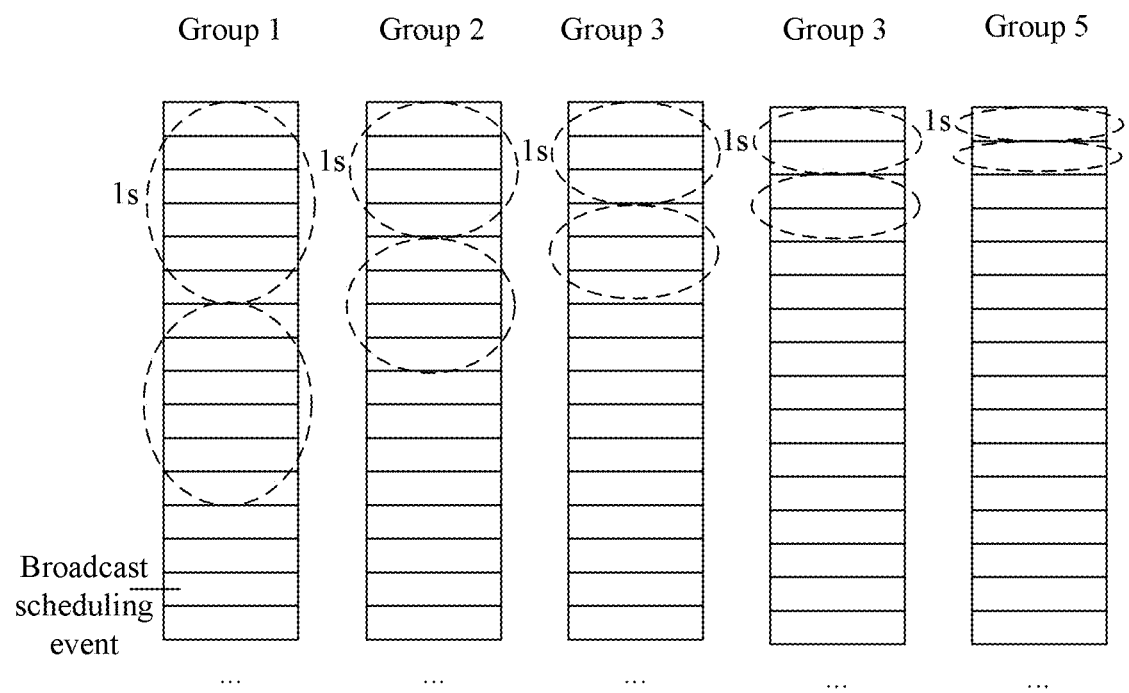
FIG. 9 is a schematic diagram of a broadcast scheduling event scheduling process according to an embodiment of this application.
FIG. 10 is a schematic diagram of a correspondence between a broadcast scheduling event and a scheduling interval according to an embodiment of this application.

Referring to FIG. 10, the terminal may calculate, based on Expression 1, I scheduling intervals corresponding to I broadcast scheduling events included in the group, where i is an integer from 0 to I-1.

It can be learned from Expression 1 that, shorter preset duration $T_0$ indicates smaller $\Delta t_i$. To be specific, a higher priority of a receiver indicates a higher priority of a group to which the receiver belongs, shorter preset duration corresponding to the group to which the receiver belongs, and at least one smaller scheduling interval corresponding to the group to which the receiver belongs, and a broadcast scheduling event can be scheduled more quickly.

It can be learned from Expression 1 that, $\Delta t_i$ is smaller if the occurrence moment $T_i$ of the broadcast scheduling event is earlier and duration between the occurrence moment of the broadcast scheduling event $T_i$ and the current moment $T_c$ is longer. In other words, if a broadcast scheduling event occurs earlier, a scheduling interval corresponding to the broadcast scheduling event is smaller, and the broadcast scheduling event needs to be scheduled more quickly.

Step 202 may include the following step:

302. The terminal successively schedules the broadcast scheduling event corresponding to each scheduling interval, in ascending order of the scheduling interval corresponding to each broadcast scheduling event.

For example, it is assumed that a magnitude relationship between the I scheduling intervals respectively corresponding to the I broadcast scheduling events in any group is $\Delta t_0 > \Delta t_1 > \ldots > \Delta t_i > \ldots > \Delta t_{I-1}$. In this case, the terminal may successively schedule, in ascending order of the scheduling intervals, an $(I-1)^{th}$ broadcast scheduling event, an $(I-2)^{th}$ broadcast scheduling event, ..., an $i^{th}$ broadcast scheduling event, ..., a $1^{st}$ broadcast scheduling event, and a $0^{th}$ broadcast scheduling event that are buffered in a queue corresponding to the group. Specifically, the terminal may schedule the $(I-1)^{th}$ broadcast scheduling event after waiting for $\Delta t_{I-1}$; schedule the $(I-2)^{th}$ broadcast scheduling event at an interval of $\Delta t_{I-2}$ after scheduling the $(I-1)^{th}$ broadcast scheduling event; schedule an $(I-3)^{th}$ broadcast scheduling event at an interval of $\Delta t_{I-3}$ after scheduling the $(I-1)^{th}$ broadcast scheduling event; and so on.

In another method, after step 301, step 202 may include step 303 and step 304.

303. The terminal selects a smallest scheduling interval from the scheduling interval corresponding to each broadcast scheduling event.

304. The terminal schedules each broadcast scheduling event in the group based on the smallest scheduling interval.

For example, it is assumed that a magnitude relationship between the I scheduling intervals respectively corresponding to the I broadcast scheduling events in any group is $\Delta t_0 > \Delta t_1 > \ldots > \Delta t_i > \ldots > \Delta t_{I-1}$. In this case, the terminal may select a smallest scheduling interval $\Delta t_I$, and successively schedule, based on $\Delta t_I$, the I broadcast scheduling events that are buffered in a queue corresponding to the group. Specifically, the terminal may successively schedule, based on $\Delta t_I$, according to a first in first out principle, the I broadcast scheduling events that are buffered in the queue corresponding to the group.

In another method, step 201 may include the following step:

401. The terminal calculates, based on Expression 2, one scheduling interval corresponding to the group, where Expression 2 is:

$$\Delta t = T_0/N, \text{ where}$$

$\Delta t$ represents the scheduling interval corresponding to the broadcast scheduling event in the group, $T_0$ represents the preset duration corresponding to the group, and N represents a quantity of broadcast scheduling events included in the group.

It can be learned from Expression 2 that, $\Delta t$ is an average scheduling interval corresponding to the group, and shorter preset duration $T_0$ indicates a smaller average scheduling interval $\Delta t$.

Step 202 may include the following step:

402. The terminal schedules each broadcast scheduling event in the group based on the one scheduling interval.

For example, if the group is the group 1 in Table 5, the group 1 includes I broadcast scheduling events, and $T_0$ is 10 ms, an average scheduling interval $\Delta t$ corresponding to the group 1 may be 10 ms/I. In this case, the terminal may successively schedule, based on 10 ms/I according to a first in first out principle, the broadcast scheduling events that are buffered in a queue corresponding to the group 1.

Further, after steps 301 to 304 and steps 401 and 402, the method may further include the following step:

501. If a broadcast scheduling event is added to the group, the terminal re-calculates at least one scheduling interval corresponding to each broadcast scheduling event in the group.

When a broadcast scheduling event is added to a group, the at least one scheduling interval calculated in steps 301 to 304 and steps 401 and 402 may also be changed. In this case, at least one scheduling interval corresponding to the group needs to be re-calculated based on an occurrence moment of a broadcast scheduling event in a current group, the preset duration, and a current moment.

Figure 11:
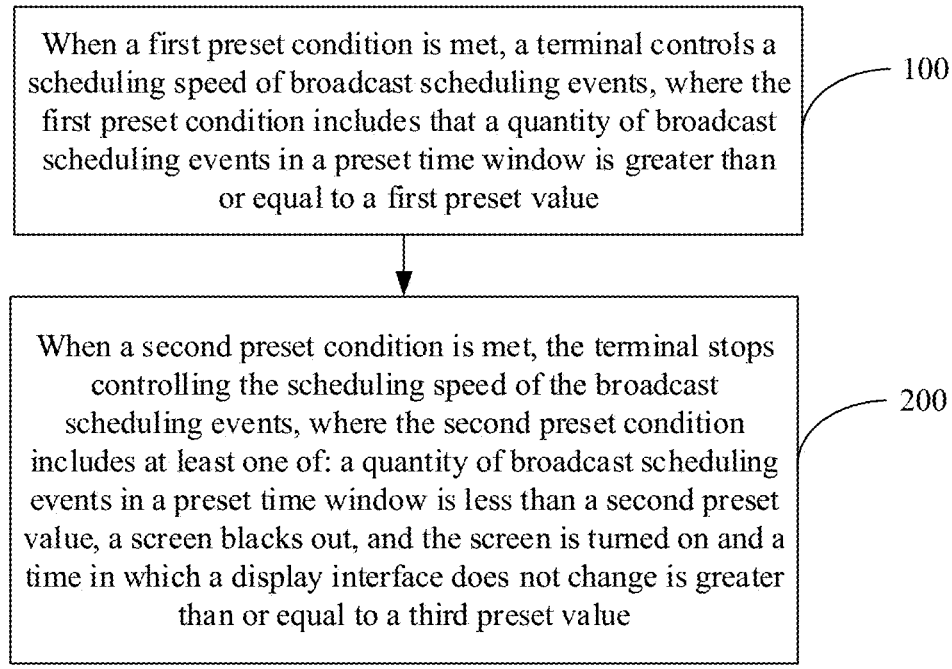
FIG. 11 is a flowchart of another scheduling method according to an embodiment of this application.

Further, referring to FIG. 11, after step 100, the method may further include the following step:

200. When a second preset condition is met, the terminal stops controlling the scheduling speed of the broadcast scheduling events, where the second preset condition includes at least one of a quantity of broadcast scheduling events in a preset time window is less than a second preset value, a screen blacks out, and the screen is turned on and a time in which the display interface does not change is greater than or equal to a third preset value.

The second preset value may be a threshold used by the terminal to predict whether the broadcast storm is resolved.

Figure 12A:
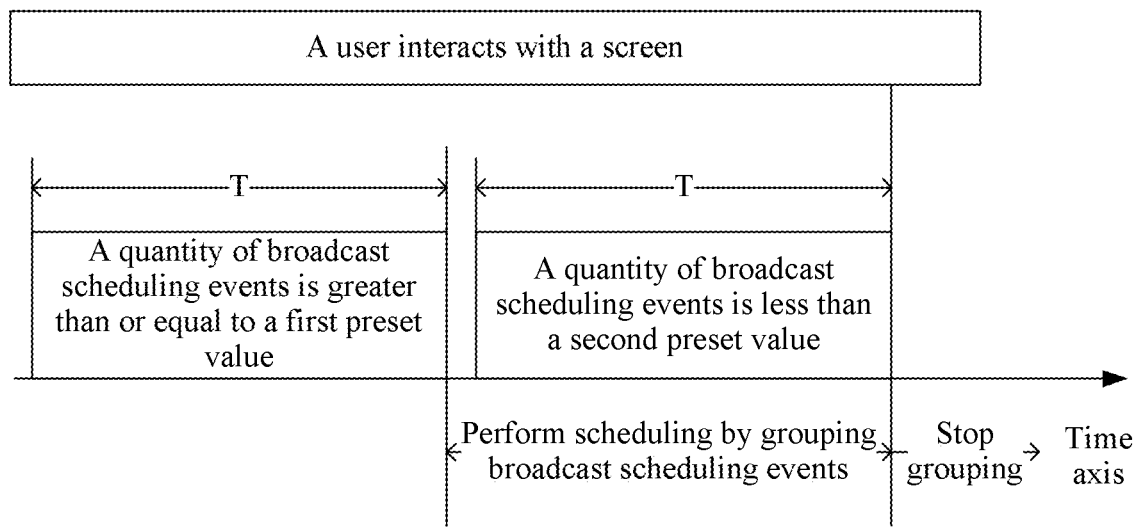
FIG. 12a is a sequence diagram of broadcast scheduling event scheduling according to an embodiment of this application.

Referring to FIG. 12a, when the quantity of broadcast scheduling events in step 100 is greater than or equal to the first preset value, and a broadcast storm is to occur, if a quantity of broadcast scheduling events in a current preset time window in a subsequent process is less than the second preset value, it may indicate that no broadcast storm may occur currently, and broadcast scheduling event scheduling does not affect interface display smoothness, a processing speed of the terminal, or the like. In this case, the broadcast storm no longer needs to be suppressed. Therefore, control over the scheduling speed of the broadcast scheduling events may be stopped.

The second preset value may be specifically set depending on an actual need. In a possible implementation, the second preset value may be greater than the first preset value. That is, when the terminal determines that there is a falling trend in the quantity of broadcast scheduling events, the terminal may consider that the broadcast storm is impossible currently.

Figure 12B:
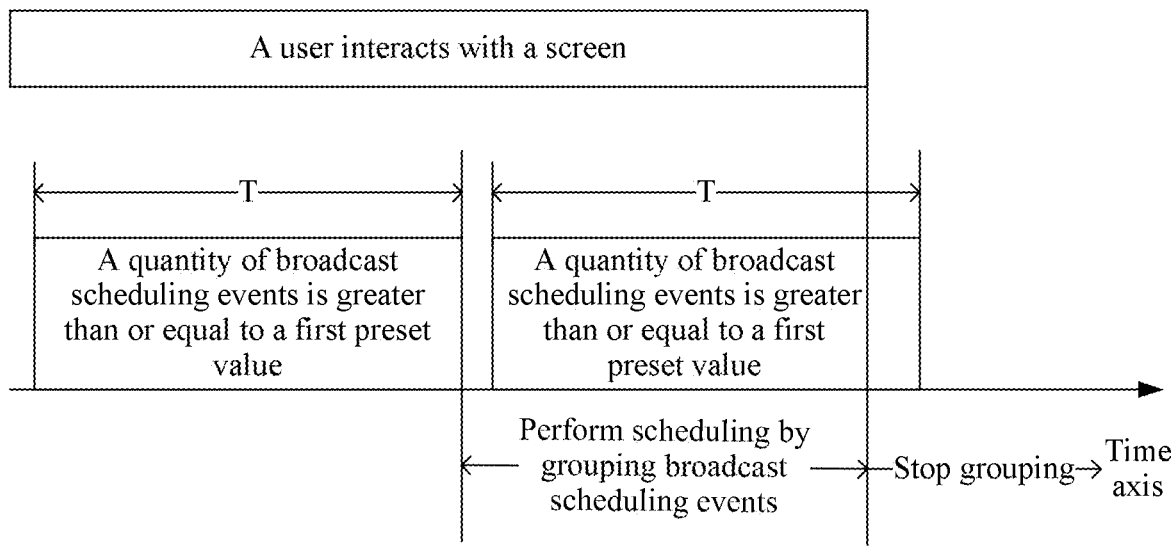
FIG. 12b is another sequence diagram of broadcast scheduling event scheduling according to an embodiment of this application.

When the screen blacks out, or the screen is turned on and the time in which the interface does not change is greater than or equal to the third preset value, it may indicate that the user has stopped interacting with the terminal screen. For example, the third preset value may be 20s. Therefore, referring to FIG. 12b, after the terminal determines, in step 100, that the quantity of broadcast scheduling events is relatively large, if, in a subsequent process, the screen blacks out or the screen is turned on and the time in which the interface does not change is greater than or equal to the preset value, the broadcast storm no longer needs to be suppressed, and the terminal may stop controlling the scheduling speed of the broadcast scheduling events.

In this case, if the terminal has previously grouped the broadcast scheduling events, the terminal may stop processing the broadcast scheduling events in different groups at different speeds. Further, for broadcast scheduling events that have been grouped into the groups, the terminal may perform scheduling without an interval, so as to increase a scheduling speed of the broadcast scheduling events. A broadcast scheduling event that has not been grouped into a group may be scheduled in a scheduling manner in the prior art.

It can be understood that, to implement the foregoing functions, a terminal device includes a corresponding hardware structure and/or software module for performing each of the functions. A person of ordinary skill in the art should be easily aware that, the algorithm steps in the examples described with reference to the embodiments disclosed in this specification may be implemented by hardware or a combination of hardware and computer software in the present invention. Whether a function is performed by hardware or computer software driving hardware depends on particular receivers and design constraints of the technical solutions. A person skilled in the art may use different methods to implement the described functions for each particular receiver, but it should not be considered that the implementation goes beyond the scope of the present invention.

In the embodiments of the present invention, functional modules of the terminal may be divided based on the foregoing method example. For example, functional modules may be divided based on functions, or two or more functions may be integrated into one processing module. The integrated module may be implemented in a form of hardware, or may be implemented in a form of a software functional module. It should be noted that the module division in the embodiments of the present invention is an example, and is merely logical function division. There may be another division manner in actual implementation.

Figure 13:
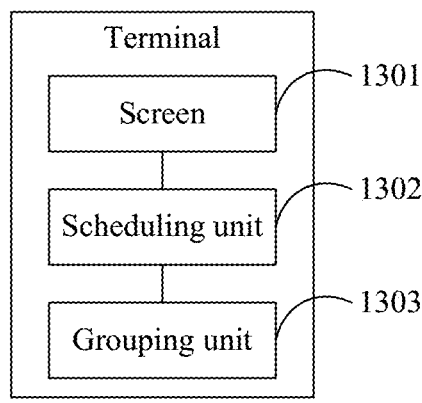
FIG. 13 is a schematic structural diagram of a terminal according to an embodiment of this application.

When the functional modules are divided based on functions, FIG. 13 is a possible schematic composition diagram of the terminal in the foregoing embodiments. As shown in FIG. 13, the terminal may include a screen 1301, a scheduling unit 1302, and a grouping unit 1303.

The screen 1301 is configured to support the terminal in presenting a display interface. The scheduling unit 1302 is configured to support the terminal in performing step 100 in FIG. 3 and FIG. 11, step 200 in FIG. 11, step 102, steps 201 and 202, steps 301 to 304, steps 401 and 402, and step 501 in the foregoing specification. The grouping unit 1303 is configured to support the terminal in performing step 101 in the foregoing specification. Further/alternatively, the units are further configured to support another process of a technology described in this specification.

It should be noted that all related content of each step in the foregoing method embodiments may be cited in function descriptions of a corresponding functional module. Details are not described herein again.

Figure 14:
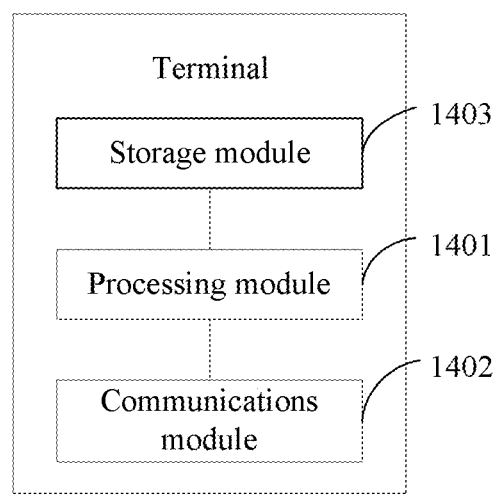
FIG. 14 is a schematic structural diagram of another terminal according to an embodiment of this application.

When an integrated unit is used, FIG. 14 is another possible schematic composition diagram of the terminal in the foregoing embodiments. As shown in FIG. 14, the terminal includes: a processing module 1401, a communications module 1402, and a storage module 1403.

The processing module 1401 is configured to perform control management on an action of the terminal. For example, the processing module 1401 is configured to support the terminal in performing step 100 in the scheduling methods shown in FIG. 3 and FIG. 11, and step 200 in the scheduling method shown in FIG. 11, and/or another process of a technology described in this specification. The communications module 1402 is configured to support communication between the terminal and another network entity. The storage module 1403 is configured to store program code and data of the terminal.

The processing module 1401 may be a processor or a controller. The processing module 1401 may implement or execute various examples of logical blocks, modules, and circuits that are described with reference to the content disclosed in the present invention. The processor may also be a combination for implementing computing functions, for example, a combination of one or more microprocessors or a combination of a microprocessor (digital signal processor, DSP) and a microprocessor. The communications module 1402 may be a transceiver, a transceiver circuit, a communications interface, or the like. The storage module 1403 may be a memory.

From the foregoing descriptions about implementations, a person skilled in the art can clearly understand that, for ease and brevity of description, division of only the foregoing functional modules is used as an example for illustration. In actual application, the foregoing functions can be allocated to and implemented by different functional modules depending on a requirement, that is, an inner structure of an apparatus is divided into different functional modules to implement all or some of the functions described above.

Figure 15:
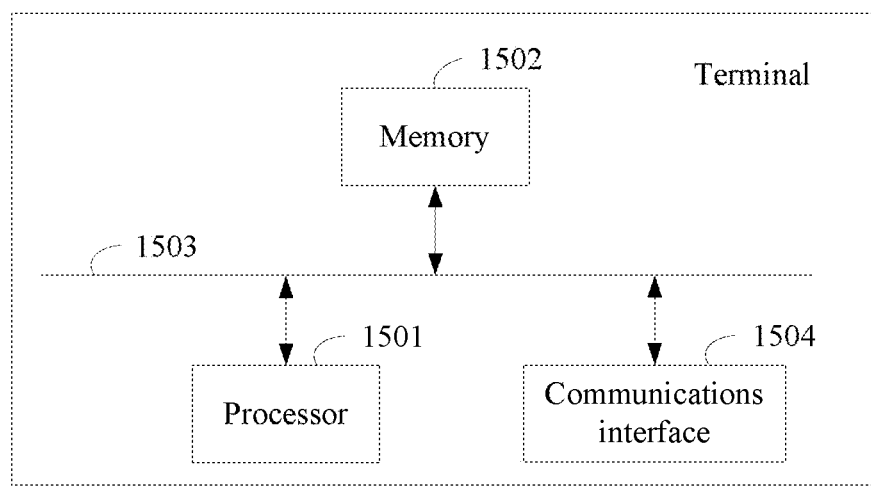
FIG. 15 is a schematic structural diagram of another terminal according to an embodiment of this application.

FIG. 15 is a schematic structural diagram of another terminal according to an embodiment of the present invention. The terminal may include a processor 1501, a memory 1502, a bus 1503, and a communications interface 1504. The processor 1501, the memory 1502, and the communications interface 1504 are connected by using the system bus 1503. The memory 1502 is configured to store a computer executable instruction. When the terminal runs, the processor 1501 executes the computer executable instruction stored in the memory 1502, so that the terminal executes the scheduling method provided in the embodiments of the present invention. For a specific scheduling method, refer to the following descriptions and related descriptions in the accompanying drawings, and details are not described herein again.

Specifically, the processor 1501 may be corresponding to functions of the scheduling unit 1302 and the grouping unit 1303. Further, the processor 1501 may be further corresponding to a function of the processing module 1401. The memory 1502 may be corresponding to a function of the storage module 1403. The communications interface 1504 may be corresponding to a function of the communications module 1402.

An embodiment of this application further provides a computer storage medium, configured to store a computer software instruction used by the terminal. When the computer software instruction runs on a computer, the computer is enabled to execute the scheduling method executed by the terminal. The storage medium may be specifically the memory 1502.

An embodiment of this application further provides a computer program product including an instruction. When the computer program product runs on a computer, the computer is enabled to execute the scheduling method executed by the terminal.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium that can be accessed by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like. Although this application is described with reference to the embodiments, in a process of implementing this application that claims protection, a person skilled in the art may understand and implement other variations of the disclosed embodiments by viewing the accompanying drawings, the disclosed content, and the appended claims. In the claims, "comprising" (comprising) does not exclude another constituent part or another step, and "a" or "one" does not exclude a case of multiple. A single processor or another unit may implement several functions enumerated in the claims. The fact that some measures are recited in mutually different dependent claims does not indicate that a combination of these measures cannot bring better effects.

Although this application is described with reference to specific features and the embodiments thereof, obviously, various modifications and combinations may be made to them without departing from the spirit and scope of this application. Correspondingly, the specification and accompanying drawings are merely examples for description of this application defined by the claims, and are intended to cover any or all modifications, variations, combinations or equivalents within the scope of this application. Obviously, a person skilled in the art can make various modifications and variations to this application without departing from the spirit and scope of this application. This application is intended to cover these modifications and variations of this application provided that these modifications and variations fall within the scope of protection defined by the claims of this application and equivalent technologies thereof.

The invention claimed is:

1. A scheduling method implemented by a terminal, the scheduling method comprising:
   determining that a first quantity of a plurality of broadcast scheduling events in a preset time window is greater than or equal to a first preset value, wherein each of the broadcast scheduling events corresponds to distribution of a respective broadcast to a corresponding receiver; and
   changing a scheduling speed of the broadcast scheduling events based on determining that the first quantity of the plurality of broadcast scheduling events in the preset time window is greater than or equal to the first preset value.

2. The scheduling method of claim 1, wherein changing the scheduling speed comprises reducing the scheduling speed by queueing one or more of the broadcast scheduling events, and wherein each respective broadcast of the broadcast scheduling events is a parallel broadcast in an ANDROID system.

3. The scheduling method of claim 1, further comprising:
   detecting that a display interface of the terminal is changing; and
   changing the scheduling speed of the broadcast scheduling events in response to multiple conditions being satisfied, wherein the multiple conditions are satisfied when the first quantity of the plurality of broadcast scheduling events in the preset time window are determined to be greater than or equal to the first preset value and the display interface of the terminal is detected to be changing.

4. The scheduling method of claim 3, wherein the display interface is detected to be changing when:
   the terminal detects a touch event of a user;
   an application is being started on the terminal;
   a first video is being played on the terminal;
   a video call is being made on the terminal;
   a second video is being recorded on the terminal; or
   an image is being shot on the terminal.

5. The scheduling method of claim 1, wherein changing the scheduling speed of the broadcast scheduling events comprises:
   grouping the broadcast scheduling events into at least two groups; and
   scheduling, for each group of the at least two groups, each broadcast scheduling event in the group based on a scheduling speed or at least one scheduling interval corresponding to the group.

6. The scheduling method of claim 5, wherein grouping the broadcast scheduling events into the at least two groups comprises grouping the broadcast scheduling events into the at least two groups based on priorities of receivers corresponding to the broadcast scheduling events.

7. The scheduling method of claim 6, wherein the receivers comprise a foreground application and a background application, and wherein a priority of the foreground application is higher than a priority of the background application.

8. The scheduling method of claim 6, wherein the receivers comprise a first application and a second application that is used less frequently than the first application, and wherein a priority of the first application is higher than a priority of the second application.

9. The scheduling method of claim 5, wherein each group of the at least two groups corresponds to a respective preset duration, wherein each group of the at least two groups corresponds to a respective scheduling interval, and wherein scheduling each broadcast scheduling event in the group comprises:
determining, based on the respective preset duration corresponding to the group, a current moment and an occurrence moment of each broadcast scheduling event in the group, wherein the at least one scheduling interval corresponds to the group; and
scheduling each broadcast scheduling event in the group based on the at least one scheduling interval corresponding to the group.

10. The scheduling method of claim 9, wherein determining the current moment and the occurrence moment of each broadcast scheduling event in the group comprises:
calculating, a corresponding scheduling interval for each broadcast scheduling event in the group according to the following formula:

$$\Delta t_i = (T_0 + T_i - T_c)/(i+1),$$

wherein $\Delta t_i$ represents a scheduling interval corresponding to an $i^{th}$ broadcast scheduling event in the group, wherein $T_0$ represents the respective preset duration corresponding to the group, wherein $T_i$ represents an occurrence moment of an $i^{th}$ broadcast scheduling event in the group, wherein $T_c$ represents the current moment, and
wherein scheduling each broadcast scheduling event in the group comprises:
selecting a smallest scheduling interval from the corresponding scheduling interval for each broadcast scheduling event; and
scheduling each broadcast scheduling event in the group based on the smallest scheduling interval.

11. The scheduling method of claim 9, wherein determining the current moment and the occurrence moment of each broadcast scheduling event in the group comprises:
calculating a corresponding scheduling interval for each broadcast scheduling event in the group according to the following formula:

$$\Delta t_i = (T_0 + T_i - T_c)/(i+1),$$

wherein $\Delta t_i$ represents a scheduling interval corresponding to an $i^{th}$ broadcast scheduling event in the group, wherein $T_0$ represents the respective preset duration corresponding to the group, wherein $T_i$ represents an occurrence moment of an $i^{th}$ broadcast scheduling event in the group, wherein $T_c$ represents the current moment, and
wherein scheduling each broadcast scheduling event in the group comprises successively scheduling each broadcast scheduling event in the group in ascending order of the corresponding scheduling interval for each broadcast scheduling event in the group.

12. The scheduling method of claim 9, wherein determining the current moment and the occurrence moment of each broadcast scheduling event in the group comprises calculating a scheduling interval corresponding to the group according to the following formula:

$$\Delta t = T_0/N,$$

wherein $\Delta t$ represents the scheduling interval corresponding to the group, wherein $T_0$ represents the respective preset duration corresponding to the group, wherein N represents a second quantity of broadcast scheduling events comprised in the group, and
wherein scheduling each broadcast scheduling event in the group comprises scheduling each broadcast scheduling event in the group based on the scheduling interval corresponding to the group.

13. The scheduling method of claim 10, further comprising:
identifying that a first broadcast scheduling event is added to the group; and
re-calculating the at least one scheduling interval corresponding to each broadcast scheduling event in the group based on identifying that the first broadcast scheduling event is added to the group.

14. The scheduling method of claim 1, further comprising:
identifying whether a second preset condition is met, wherein the second preset condition comprises that the first quantity of the broadcast scheduling events in the preset time window is less than a second preset value, that a screen blacks out, or that the screen is turned on and a time in which a display interface of the terminal does not change is greater than or equal to a third preset value; and
stopping controlling the scheduling speed of the broadcast scheduling events when the second preset condition is met.

15. A terminal, comprising:
a processor; and
a memory coupled to the processor and configured to store programming instructions that, when executed by the processor, cause the terminal to:
determine that a quantity of broadcast scheduling events in a preset time window is greater than or equal to a first preset value, wherein each of the broadcast scheduling events corresponds to distribution of a respective broadcast to a receiver; and
change a scheduling speed of the broadcast scheduling events based on determining that the first quantity of the plurality of broadcast scheduling events in the preset time window is greater than or equal to the first preset value.

16. The terminal of claim 15, wherein each respective broadcast of the broadcast scheduling events is a parallel broadcast in an ANDROID system.

17. The terminal of claim 15, wherein the instructions are further configured to cause the terminal to:
detect that a display interface of the terminal is changing; and
change the scheduling speed of the broadcast scheduling events in response to multiple conditions being satisfied, wherein the multiple conditions are satisfied when the first quantity of the plurality of broadcast scheduling events in the preset time window are determined to be greater than or equal to the first preset value and the display interface of the terminal is detected to be changing.

18. The terminal of claim 17, wherein the display interface is detected to be changing when:
   the terminal detects a touch event of a user;
   an application is being started on the terminal;
   a first video is being played on the terminal;
   a video call is being made on the terminal;
   a second video is being recorded on the terminal; or
   an image is being shot on the terminal.

19. The terminal of claim 15, wherein the programming instructions are configured to cause the terminal to change the scheduling speed of the broadcast scheduling events by causing the terminal to:
   group the broadcast scheduling events into at least two groups; and
   schedule, for each group of the at least two groups, each broadcast scheduling event in the group based on a scheduling speed or at least one scheduling interval corresponding to the group.

20. A scheduling method implemented by a terminal, the scheduling method comprising:
   detecting that a display interface of the terminal is changing; and
   reducing a scheduling speed of a plurality of broadcast scheduling events based in part on the detecting.

\* \* \* \* \*